US011831579B2

(12) United States Patent
Rajagopal

(10) Patent No.: US 11,831,579 B2
(45) Date of Patent: Nov. 28, 2023

(54) METHOD AND APPARATUS FOR FRONTHAUL COMPRESSION IN CLOUD RAN

(71) Applicant: MAVENIR NETWORKS, INC, Richardson, TX (US)

(72) Inventor: Sridhar Rajagopal, Plano, TX (US)

(73) Assignee: MAVENIR NETWORKS, INC, Richardson, TX (US)

(*) Notice: Subject to any disclaimer, the term of this patent is extended or adjusted under 35 U.S.C. 154(b) by 534 days.

(21) Appl. No.: 17/071,487

(22) Filed: Oct. 15, 2020

(65) Prior Publication Data

US 2021/0105125 A1 Apr. 8, 2021
US 2022/0166585 A9 May 26, 2022

Related U.S. Application Data

(63) Continuation of application No. PCT/US2019/031077, filed on May 7, 2019.
(Continued)

(51) Int. Cl.
*H04L 5/00* (2006.01)
*H04W 28/06* (2009.01)
(Continued)

(52) U.S. Cl.
CPC ......... *H04L 5/0053* (2013.01); *H04W 28/06* (2013.01); *H04W 72/21* (2023.01); *H04W 72/23* (2023.01);
(Continued)

(58) Field of Classification Search
CPC ..... H04W 92/02; H04W 28/06; H04W 72/21; H04W 74/0833; H04W 72/23;
(Continued)

(56) References Cited

U.S. PATENT DOCUMENTS 6,538,986 B2  3/2003 Isaksson et al.
10,355,895 B2*  7/2019 Barbieri .................. H04L 69/04
(Continued)

FOREIGN PATENT DOCUMENTS

EP  2574138 A1  3/2013
WO  2017023066 A1  2/2017
(Continued)

OTHER PUBLICATIONS

International Search Report and Written Opinion for corresponding International (PCT) application No. PCT/US19/31077, 37 pages, dated Jul. 12, 2019.
(Continued)

*Primary Examiner* — Oussama Roudani
(74) *Attorney, Agent, or Firm* — Ruggiero, McAllister & McMahon LLC

(57) ABSTRACT

A cloud radio access network (CRAN) system includes a baseband unit (BBU) and a radio unit (RU) remote from the BBU. The fronthaul interface between the RU and the BBU includes a radio frequency interface (RF) functionality implemented in the RU, and implementation of physical layer (PHY) functionality split between the BBU and the RU, including downlink (DL) resource element mapping and DL precoding implemented in the RU. Transmission of reference signals from the BBU to the RU is implemented separately from transmission of data from the BBU to the RU. The RU caches the transmitted reference signal based on at least one of subframe, symbol, xRAN resource block (XRB) and resource element (RE) associated with the reference signal. The fronthaul interface supports at least one of: (i) narrow band Internet of things (NB-IoT) physical random access channel (PRACH), and (ii) NB-IoT multi-tone format on physical uplink shared channel (PUSCH).

14 Claims, 17 Drawing Sheets

Related U.S. Application Data

(60) Provisional application No. 62/668,008, filed on May 7, 2018.

(51) Int. Cl.
| | |
|---|---|
| *H04W 74/08* | (2009.01) |
| *H04W 88/08* | (2009.01) |
| *H04W 92/02* | (2009.01) |
| *H04W 72/21* | (2023.01) |
| *H04W 72/23* | (2023.01) |

(52) U.S. Cl.
CPC ..... *H04W 74/0833* (2013.01); *H04W 88/085* (2013.01); *H04W 92/02* (2013.01)

(58) Field of Classification Search
CPC .. H04W 88/085; H04W 92/12; H04L 5/0053; H04L 5/0048; H04L 5/0094; H04L 27/34; H04L 5/0023; H04B 7/0456
See application file for complete search history.

(56) References Cited

U.S. PATENT DOCUMENTS

| | | | | |
|---|---|---|---|---|
| 10,616,016 | B2* | 4/2020 | Fertonani | H04L 69/40 |
| 11,190,238 | B2* | 11/2021 | Lange | H04L 12/46 |
| 2012/0208523 | A1* | 8/2012 | Hans | H04W 64/00 |
| | | | | 455/7 |
| 2015/0085785 | A1 | 3/2015 | Kim et al. | |
| 2017/0208591 | A1* | 7/2017 | Rico Alvarino | H04L 27/18 |
| 2017/0237831 | A1* | 8/2017 | Yang | H04L 69/04 |
| | | | | 370/230 |
| 2017/0250927 | A1* | 8/2017 | Stapleton | H04B 10/25753 |
| 2017/0251493 | A1* | 8/2017 | Zhang | H04L 27/2628 |
| 2018/0042040 | A1* | 2/2018 | Chen | H04W 72/1263 |
| 2018/0138957 | A1* | 5/2018 | Wang | H04W 92/00 |
| 2018/0234875 | A1* | 8/2018 | Leroudier | H04W 24/00 |
| 2018/0310244 | A1* | 10/2018 | Wich | H04W 52/242 |
| 2022/0407593 | A1* | 12/2022 | Moon | H04W 72/21 |

FOREIGN PATENT DOCUMENTS

| | | |
|---|---|---|
| WO | 2017039374 A1 | 3/2017 |
| WO | 2018063063 A1 | 4/2018 |
| WO | 2018024472 A1 | 8/2018 |

OTHER PUBLICATIONS

Extended European Search Report for corresponding European application No. EP 19 80 0722, 11 pages, dated Dec. 22, 2021.

3GPP "X-RAN Forum-Fronthaul Working Group-White Paper" X-RAN Forum, Oct. 1, 2017.

3 GPP TSG RAN WG3 Meeting #93"Architectural aspect of split options 3/5/7" 3GPP Draft; R3-161811 3rd Generation Partnership Project, Aug. 26, 2016.

"3rd Generation Partnership Project TR 38.801 v2.0; Technical Specification Group Radio Access Network; Study on New Radio Access Technology; Radio Access Architecture and Interfaces(Release 14)" 3rd Generation Partnership Project, Mar. 2017.

International Preliminary Report on Patentability for corresponding International (PCT) application No. PCT/US19/31077, 7 pages, dated Nov. 10, 2020.

* cited by examiner

| $b(n), b(n+1), b(n+2), b(n+3)$ | $I$ | $Q$ |
|---|---|---|
| 0000 | $1/\sqrt{10}$ | $1/\sqrt{10}$ |
| 0001 | $1/\sqrt{10}$ | $3/\sqrt{10}$ |
| 0010 | $3/\sqrt{10}$ | $1/\sqrt{10}$ |
| 0011 | $3/\sqrt{10}$ | $3/\sqrt{10}$ |
| 0100 | $1/\sqrt{10}$ | $-1/\sqrt{10}$ |
| 0101 | $1/\sqrt{10}$ | $-3/\sqrt{10}$ |
| 0110 | $3/\sqrt{10}$ | $-1/\sqrt{10}$ |
| 0111 | $3/\sqrt{10}$ | $-3/\sqrt{10}$ |
| 1000 | $-1/\sqrt{10}$ | $1/\sqrt{10}$ |
| 1001 | $-1/\sqrt{10}$ | $3/\sqrt{10}$ |
| 1010 | $-3/\sqrt{10}$ | $1/\sqrt{10}$ |
| 1011 | $-3/\sqrt{10}$ | $3/\sqrt{10}$ |
| 1100 | $-1/\sqrt{10}$ | $-1/\sqrt{10}$ |
| 1101 | $-1/\sqrt{10}$ | $-3/\sqrt{10}$ |
| 1110 | $-3/\sqrt{10}$ | $-1/\sqrt{10}$ |
| 1111 | $-3/\sqrt{10}$ | $-3/\sqrt{10}$ |

FIGURE 8

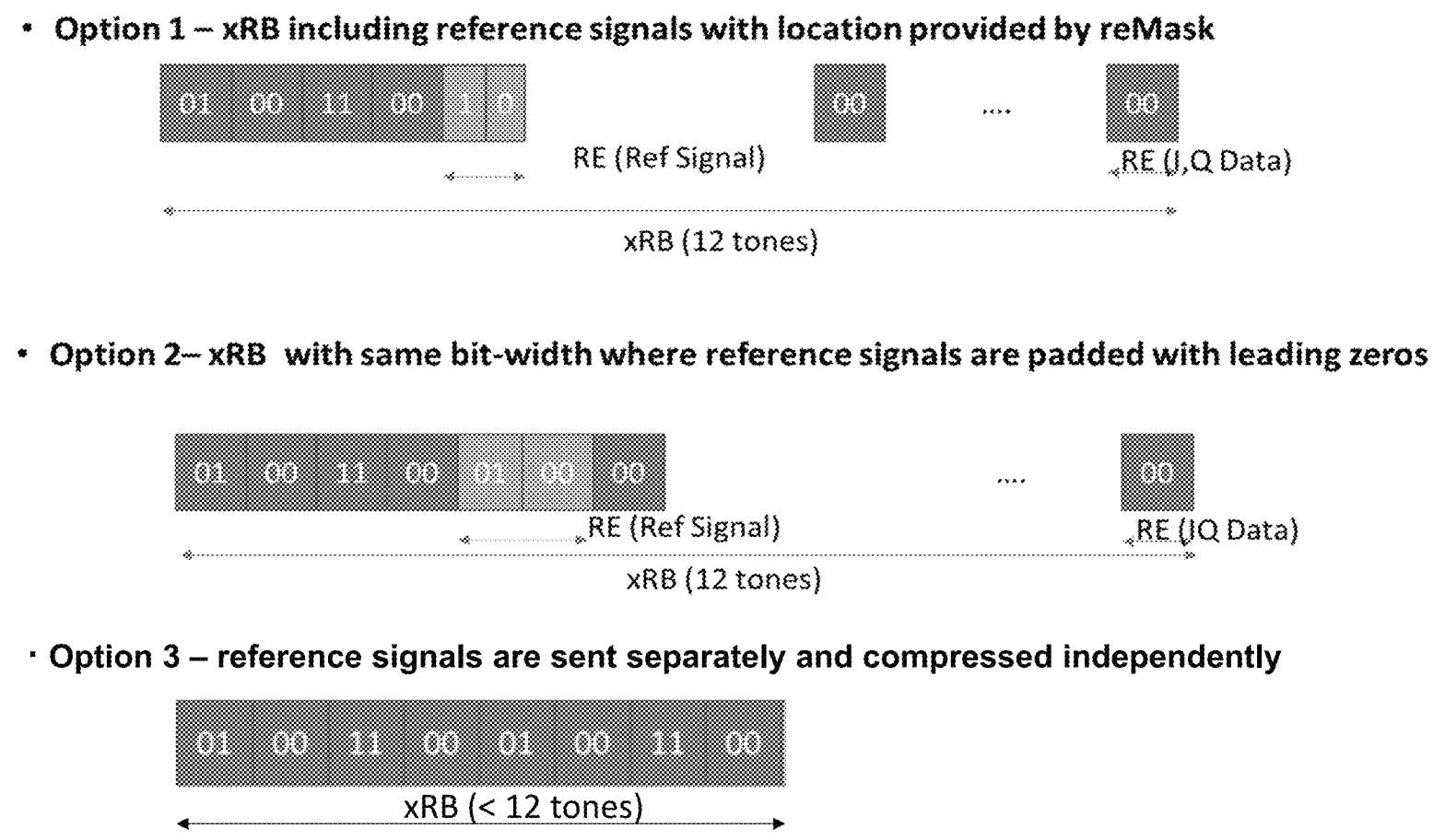

- Option 1 – xRB including reference signals with location provided by reMask
- Option 2 – xRB with same bit-width where reference signals are padded with leading zeros
- Option 3 – reference signals are sent separately and compressed independently

FIGURE 9

| TM Type | Cell Specific RS ports | Modulation type | Number of layers | Number of codewords | Total num of Precoder constellation points | Number of bits |
|---|---|---|---|---|---|---|
| | 4 | QPSK | 2 | 1 or 2 | 4 | 2 |
| | | 16QAM | | | 16 | 4 |
| | | QPSK | 3 | 1 or 2 | 84 | 7 |
| | | QPSK | 4 | 1 or 2 | 25 | 5 |
| | | 16QAM | | | 169 | 8 |
| TM3 | 2 | QPSK | 2 | 2 | 9 | 4 |
| | | 16QAM | | | 49 | 6 |

FIGURE 10

| udCompMeth | 0 (msb) | 1 | 2 | 3 | 4 | 5 | 6 | 7 (lsb) | compParam size |
|---|---|---|---|---|---|---|---|---|---|
| 0000b = no compression | absent | | | | | | | | 0 octets |
| 0001b = block fl. point | reserved (set to all zeros) | | | | exponent (unsigned) | | | | 1 octet |
| 0010b = block scaling (option 1) | ConstellationIndex(1 bit) | scaler (15 bits) | | | | | | | 2 octets |
| 0011b = μ-law | absent | | | | | | | | 0 octets |
| 0100 = constellationIndex (option 2) | scalingFactor (16 bits) | | | | | | | | 2 octets |
| 0100b – 1111b | reserved (set to all zeros) | | | | | | | | ? octets |

FIGURE 12

| | | | Octet P |
|---|---|---|---|
| sectionId | | 1 | P+1 |
| rb | symInc | startXrbu | |
| | | 1 | P+2 |
| startXrbu | | 1 | P+3 |
| numXrbu | | 1 | P+4 |
| reserved | udCompParam | numRE | 1 | P+5 |
| iSample (1st RE) | | 1* | P+6 |
| qSample (1st RE) | | 1* | P+7* |
| ... | | | |
| qSample (Mth RE) | | 1* | P+28* |

FIGURE 13

METHOD AND APPARATUS FOR FRONTHAUL COMPRESSION IN CLOUD RAN

CROSS REFERENCE TO RELATED APPLICATIONS

The present application is a continuation application of International (PCT) application No. PCT/US2019/031077 filed on May 7, 2019 which claims priority to U.S. Provisional Patent Application No. 62/668,008, filed on May 7, 2018, both of which are incorporated herein by reference in their entireties.

BACKGROUND OF THE DISCLOSURE

1. Field of the Disclosure

The present disclosure relates to systems and methods for radio access networks (RAN), and relates more particularly to reducing the bandwidth of the fronthaul interface for RANs for $4^{th}$-Generation (4G) and $5^{th}$-Generation (5G) based mobile networks.

2. Description of the Related Art

Conventional RANs were built as an integrated unit where the entire RAN was processed. Conventional RANs implement the protocol stack (e.g., Physical Layer (PHY), Media Access Control (MAC), Radio Link Control (RLC), Packet Data Convergence Control (PDCP) layers) at the base station (also referred to as the eNodeB or eNB). In addition, conventional RANs use application specific hardware for processing, which make the conventional RANs difficult to upgrade and evolve. As future networks evolve to have massive densification of networks to support increased capacity requirements, there is a growing need to reduce the capital and operating costs of RAN deployment and make the solution scalable and easy to upgrade.

SUMMARY OF THE DISCLOSURE

Cloud-based Radio Access Networks (CRANs) are networks where a significant portion of the RAN layer processing is performed at a baseband unit (BBU) located in the cloud on commercial off-the-shelf servers (COTS), while the radio frequency (RF) and real-time critical functions can be processed in the remote radio unit (RRU), also referred to as the radio unit (RU). The BBU may also be virtualized, in which case it is also known as vBBU. In some instances, e.g., in documents such as the Open Radio Access Network (O-RAN) specification, BBU is also called a lower layer split central unit (lls-CU).

For the RU and BBU to communicate, an interface called the fronthaul is provided. FIG. 1 shown an example embodiment of a functional split for CRAN, with vBBU 1003, RUs 1001 and 1002, and the fronthaul split 101. There are various aspects which must be considered for the fronthaul interface design since the splitting of the RAN functions into the RU and the BBU impacts the transport latency and bandwidth requirements. In addition, there are many different features in RAN that need to be supported. For these reasons, the choice of the split of the RAN functions and the communication interface aspects need to be carefully designed.

The present disclosure provides example embodiments of a physical layer functional split between the BBU and the RUs that i) maximizes the efficiency of the transport and ii) allows the flexibility to support many of the features required for virtualization and commercialization of the CRAN technology.

In traditional LTE networks, all the LTE functionalities and the layers of the LTE protocol stack reside in the evolved Nod B (eNB) small cell, which is deployed at the cell site. Some of the benefits of the CRAN technology solution (e.g., splitting the BBU and the RRU) in comparison to traditional Long Term Evolution (LTE) networks technology are summarized here. CRAN provides flexibility to the Mobile network operators (MNOs) to be able to optimize system performance in real-time by varying various configuration and system parameters using the cloud-based infrastructure. As new wireless technologies and standards appear, MNOs are required to upgrade their eNB small cells, which upgrade usually involves high costs. Using the CRAN, most of the LTE functionalities in the BBU can be software-based, which means the functionalities can be easily upgraded with reduced costs when new wireless technologies appear. In addition, a software-based BBU in the cloud provides other benefits, e.g., flexibility in adding new services, and a significant reduction in operation and management (OAM) costs.

To enable the CRAN technology solution, the LTE/$5^{th}$-Generation New Radio (5G-NR) functionalities need to be split between the BBU in the cloud and the RRU onsite. $3^{rd}$ Generation Partnership Project (3GPP) has defined 8 options for the split between the BBU and the RRU among different layers of the protocol stack, which 8 options are shown in FIG. 2. In Option 1, radio resource control (RRC) is in the central unit, while packet data convergence protocol (PDCP), radio link control (RLC), media access control (MAC), physical layer and radio frequency interface (RF) are in the radio unit. In Option 2, RRC and PDCP are in the central unit, while RLC, MAC, physical layer and RF are in the radio unit. In Option 3 (which is an intra-RLC split), Low RLC (one partial function of RLC), MAC, physical layer and RF are in the radio unit, while PDCP and high RLC (the other partial function of RLC) are in the central unit. In Option 4 (which is an RLC-MAC split), MAC, physical layer and RF are in the radio unit, while PDCP and RLC are in the central unit. In Option 5 (which is an intra-MAC split), RF, physical layer and some part of the MAC layer (labeled "Low-MAC," which can include, e.g. hybrid automatic repeat request (HARM)) are in the distributed unit, while upper layers (i.e., remaining functionality layers) are in the radio unit. In Option 6 (which is a MAC-physical layer (PHY) split), physical layer and RF are in the radio unit, while upper layers are in the central unit. In Option 7 (which is an intra-physical layer split), a part of the physical layer function (labeled "Low-PHY") and RF are in the radio unit, while upper layers are in the central unit. In Option 8 (which is a physical layer-RF split), RF functionality is in the radio unit, while upper layers are in the central unit.

There are multiple factors which influence the selection of the fronthaul split option:

Bandwidth: Different split options have different bandwidth requirements, which play a crucial role in determining the fronthaul design. As an example, option 8 (PHY-RF split) has very high requirements on the fronthaul bandwidth, which may imply higher resource consumption and costs in transport dimensioning (link capacity, equipment, etc.). On the other hand, one of the benefits of option 5 (intra-MAC split) is that it reduces the bandwidth needed on fronthaul.

Latency: The point in the LTE/5G-NR protocol stack where the split between the BBU and the RRU is implemented affects the latency. For example, splitting between RRC and PDCP in the above-noted split option 1 has very low latency requirements, and this split option 1 is useful in handling some edge computing or low-latency use cases in which the user data needs to be located close to the transmission point. In the split option 5, i.e., intra-MAC split, time-critical functions are present in the Low-MAC sublayer which includes the functions with stringent delay requirements, e.g., hybrid automatic repeat request (HARM), or the functions where performance is proportional to latency, e.g., radio channel and signal measurements from PHY, random access control. This split option reduces the delay requirements on the fronthaul interface. On the other hand, the split option 8 has very high requirements on fronthaul latency, which may cause constraints on network deployments with respect to network topology and available transport options.

Implementation Cost: Higher level splits on the protocol stack usually have high implementation costs compared to lower splits since lower splits allow for more virtualization. As an example, in split option 8, separation of RF and PHY allows pooling of PHY resources, which may enable a more cost-efficient dimensioning of the PHY layer. Separation of RF and PHY allows operators to share RF components, which may reduce system and site costs. On the other hand, high requirements on fronthaul bandwidth with lower splits implies higher resource consumption and costs in transport dimensioning (e.g., link capacity, equipment, etc.).

Other factors which influence the selection of the fronthaul split option include virtualization benefits, complexity of the fronthaul interface, expansion flexibility, computing power, and memory requirement.

Although the present disclosure presents the split option 7 (i.e., intra-PHY split), with added compression on the interface to optimize the bandwidth, as an example embodiment for the purposes of illustrating detailed aspects, the present disclosure is not limited to the split option 7 example, and the present disclosure is intended to encompass other split options mentioned above.

Some of the justifications to optimize the fronthaul interface bandwidth are summarized here. First, layer-based and bit-oriented interfaces greatly benefit large-antenna-based deployments, and such enhancements can reduce fronthaul requirements by 2×-4× beyond antenna-port-based interfaces. Second, transport to enterprise deployments are bandwidth constrained, i.e., provisioning is based on averages. Statistical multiplexing enables support for peak rates to a single radio. Enterprise deployments can use statistical multiplexing to balance UL streams to DL rates. Each deployment consists of 10's of radios with low physical resource block (PRB) usage. Each radio can use 1 to N uplink (UL) streams-based deployment specific conditions (bandwidth (BW), PRB usage, etc.).

As a third justification, multi-radio macro sites can efficiently use and grow bandwidth (BW) on existing fiber, and use of existing fiber can be extended. Although a single strand with coarse wavelength division multiplexing (CWDM) can support current BW needs, upgrade to 8 T or addition of 3 sectors of full dimension multiple-input, multiple-output (FD-MIMO) will push it to capacity. Further expansion of technologies such as licensed assisted access (LAA) and higher downlink (DL) resource block (RB) usage can benefit from optimizing the fronthaul interface bandwidth.

As a fourth justification, leased fronthaul BW, which is not an option today due to common public radio interface (CPRI) inefficiency, becomes viable. Leased BW is not economical today due to CPRI characteristics. Further reduction of DL is also necessary in asymmetric conditions (LAA, time division duplex (TDD), etc.). As a fifth justification, low rank transmissions (with low number of layers) are very common in multiple antenna system deployments due to channel and UE constraints. For example, rank 1 usage can be more than 50% in macro deployments, which makes the fronthaul interface very inefficient if the bandwidth is dependent on the number of antenna ports. As a sixth justification, uplink streams can be combined/downselected at the RRU.

The present disclosure provides improvements to extensible Radio Access Network (xRAN) Fronthaul Specification version 1.0, e.g., for control (C), user (U) and synchronization (S) planes.

The present disclosure provides an example embodiment of a cloud radio access network (CRAN) system which includes a baseband unit (BBU) and a radio unit (RU) remote from the BBU. The fronthaul interface between the RU and the BBU includes a radio frequency interface (RF) functionality implemented in the RU, and implementation of split for downlink and uplink at physical layer (PHY) functionality split between the BBU and RU. Periodic reference signals, such as the primary synchronization signal (PSS), secondary synchronization signal (SSS) and common reference signals (CRS) are sent separately from the data for the fronthaul interface, thereby allowing separate optimizations for the data transmissions independent of reference signals. These signals are periodic and hence, can benefit from being stored locally instead of transmitting them continuously on the fronthaul interface.

The present disclosure provides an example method of providing a fronthaul interface in the CRAN system, which method includes: providing radio frequency interface (RF) functionality in the RU; providing physical layer (PHY) functionality split between the BBU and the RU; and sending periodic reference signals separately from the data for a fronthaul interface, thereby allowing separate optimizations for the data transmissions independent of reference signals.

The present disclosure provides an example method of providing a fronthaul interface in the CRAN system, which method includes: providing radio frequency interface (RF) functionality in the RU; providing physical layer (PHY) functionality split between the BBU and the RU; and sending periodic reference signals separately from the data for a fronthaul interface, thereby allowing separate optimizations for the data transmissions independent of reference signals, where the transmitted reference signals are stored locally on the RU and inserted into transmission from the RU to eliminate the need for periodic transmissions of the same reference signal on the fronthaul interface.

The present disclosure provides an example method of providing a fronthaul interface in the CRAN system, which method includes: providing radio frequency interface (RF) functionality in the RU; providing physical layer (PHY) functionality split between the BBU and the RU; and compressing the fronthaul data by sending the constellation point indices instead of the actual fronthaul data.

The present disclosure provides an example method of providing a fronthaul interface in the CRAN system, which method includes: providing radio frequency interface (RF) functionality in the RU; providing physical layer (PHY) functionality split between the BBU and the RU; and supporting NB-IoT PRACH and multi-tone support on the PUSCH using the fronthaul interface.

The present disclosure provides an example method of providing a fronthaul interface in the CRAN system, which method includes: providing radio frequency interface (RF) functionality in the RU; providing physical layer (PHY) functionality split between the BBU and the RU; and supporting narrow band Internet of things (NB-IoT) physical random access channel (PRACH) by transmitting all the 48 subcarriers corresponding to 180 KHz over the fronthaul interface and letting the BBU decide the physical random access channel (PRACH) locations.

The present disclosure provides an example method of providing a fronthaul interface in the CRAN system, which method includes: providing radio frequency interface (RF) functionality in the RU; providing physical layer (PHY) functionality split between the BBU and the RU; and supporting multi-tone narrow band Internet of things (NB-IoT) physical uplink shared channel (PUSCH) by communicating the number of tones to be used via the management (M)-plane.

BRIEF DESCRIPTION OF THE DRAWINGS

Non-limiting and non-exhaustive embodiments are described with reference to the following drawings. In the drawings, like reference numerals refer to like parts throughout the various figures unless otherwise specified. For a better understanding, reference will be made to the following detailed description, which is to be read in association with the accompanying drawings.

FIG. 8 illustrates an example table for 16-quadrature amplitude modulation (QAM) constellation mapping.

FIG. 9 illustrates various example options for reference signal handling.

FIG. 10 illustrates various examples of QPSK and 16-QAM modulations for TM3.

FIG. 12 illustrates various example compression options in accordance with the present disclosure.

FIG. 13 illustrates the transmission of numRE parameter value for NB-IoT over the management plane.

DETAILED DESCRIPTION OF THE EMBODIMENTS

Figure 1:
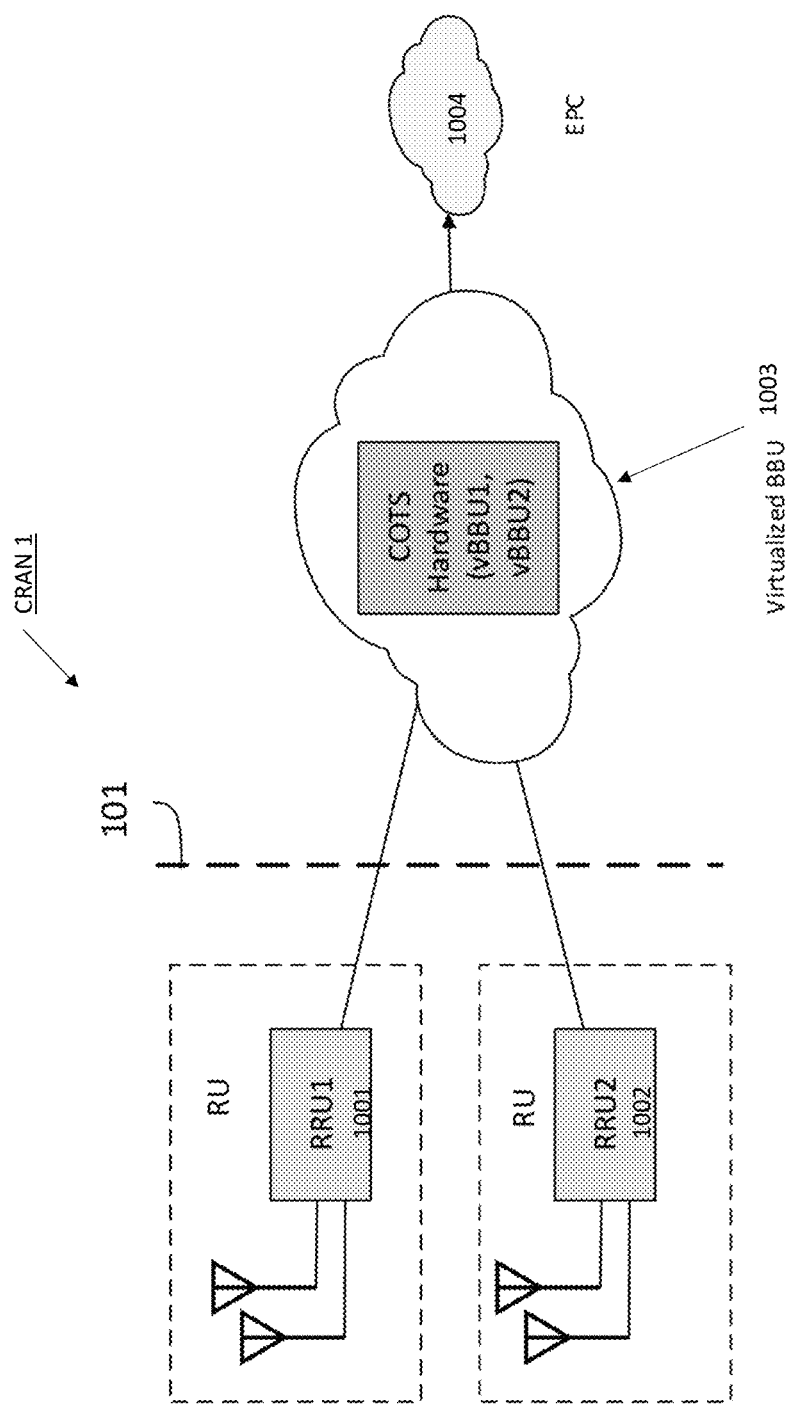
FIG. 1 illustrates an example of a CRAN system architecture and a functional split between a virtualized baseband unit (vBBU) and radio units (RUs).

As previously mentioned, FIG. 1 illustrates an example of a functional split for CRAN 1 with the virtualized baseband unit (vBBU) 1003 and RUs 1001 and 1002. The dotted line 101 represents the fronthaul split point. The vBBU is connected to the evolved packet core (EPC) 1004 via the backhaul interface and is connected to the RU(s) via the fronthaul interface. Data and control signals are communicated between the vBBU and the RUs in both directions (upstream and downstream). Different versions of the RUs, connected to the vBBU, can be made available depending on the RU category types, e.g., depending on what the RU can and cannot support, and the vBBU is responsible for supporting different RU categories.

Figure 2:
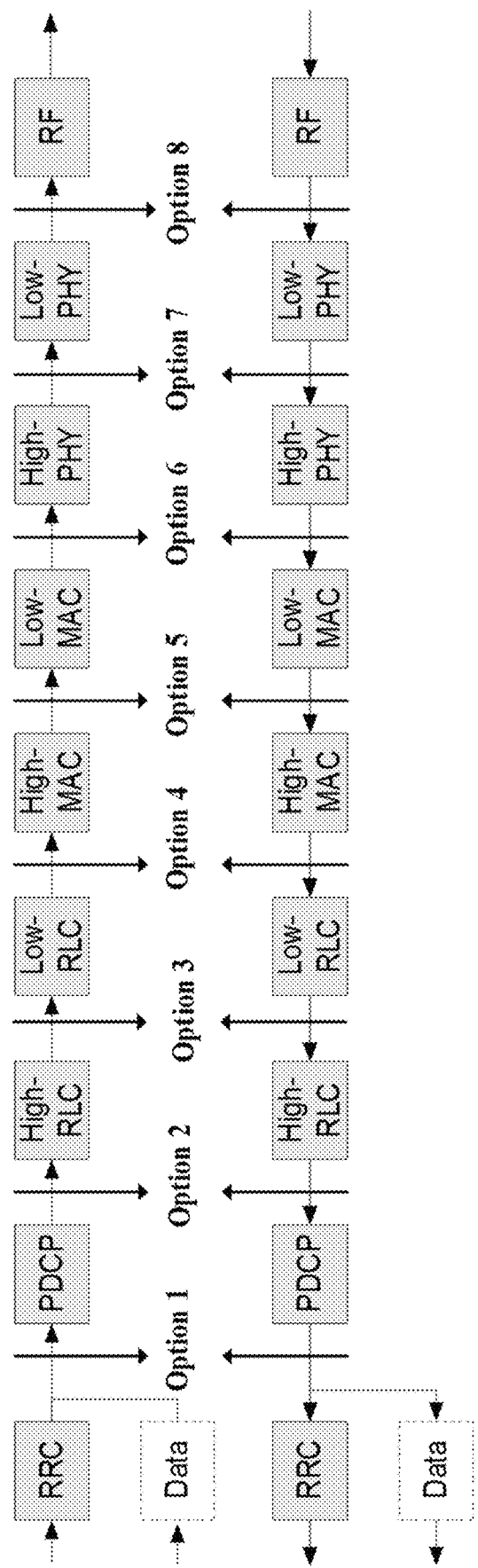
FIG. 2 illustrates different options for splitting of functionalities between the BBU and the RRU among different layers of the protocol stack.

Regarding the split option 7 (i.e., intra-PHY split) shown in FIG. 2, there are multiple ways in which the PHY can be split, with each alternative having a different impact on the amount of virtualization and on the transport interface requirements for latency and throughput. In particular, as systems expand towards larger number of antennas in the base-station, the number of data streams (layers) transmitted to and from the mobile device (or user equipment (UE)) still remains fairly small. One reason for this is that it is difficult for the channel to support multiple layer transmissions without accurate channel state information. Hence, under interference, low signal-to-noise ratio (SNR) and mobility conditions, limited number of layers are transmitted even though the base-station can support more layers. Another reason for the small number of data streams (layers) transmitted to and from the mobile devices is that many of the mobile devices operating in the network can be of low cost and low complexity, and therefore may not support more than 1 or 2 layers, especially on uplink.

Figure 3:
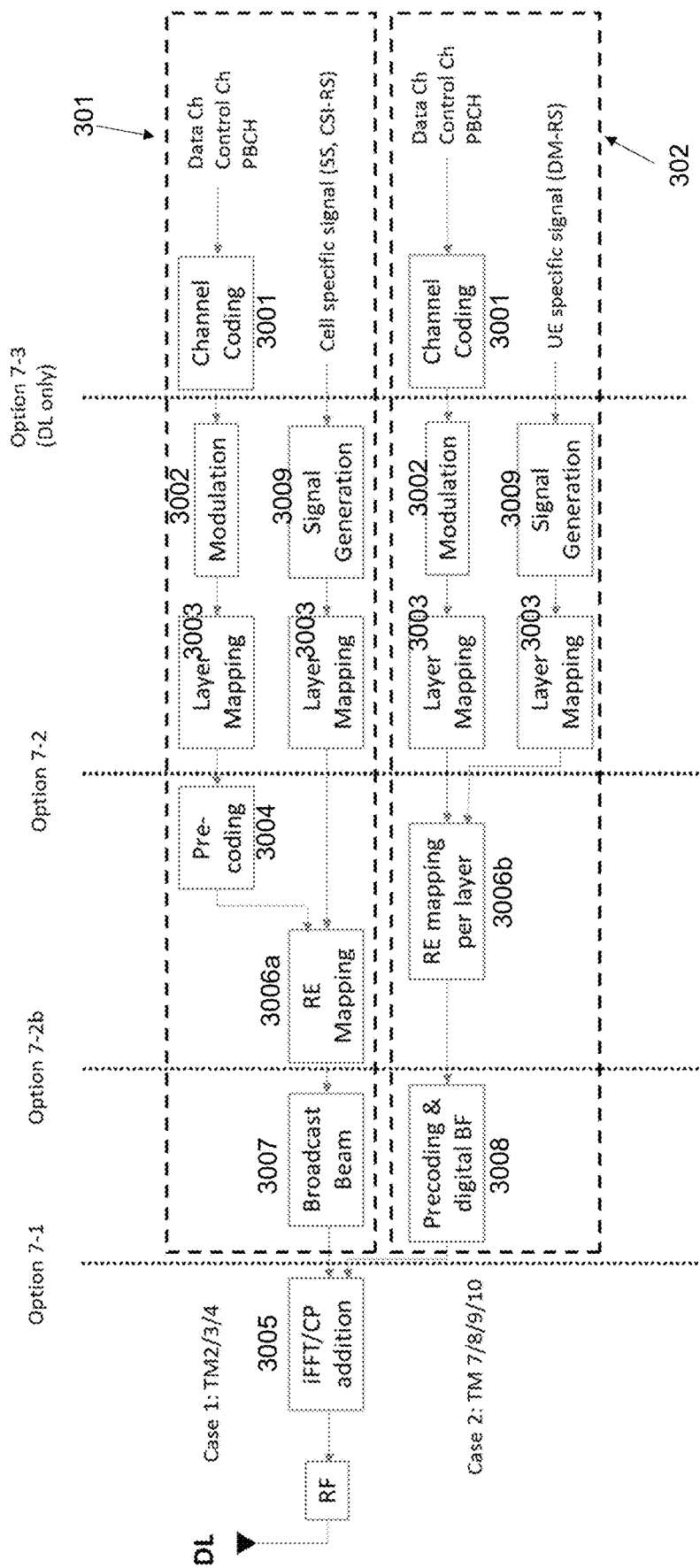
FIG. 3 illustrates the various split options defined for the intra-physical layer (PHY) split.

FIG. 3 shows the various split options defined for the intra-PHY split, for two different example cases. The upper block diagram (referenced as 301) is for Case 1, which involves Transmission Modes (TMs) 2, 3 and 4. The lower block diagram (referenced as 302) is for Case 2, which involves TMs 7, 8, 9 and 10. Option 7-3 is placed after the channel coding interface 3001 and before modulation block 3002. Option 7-2 is placed after the layer mapping interface 3003. Option 7-1 is placed before the inverse Fast Fourier Transform (IFFT)/CP addition interface 3005. Option 7-2b (also referred to as option 7-2x) is placed after the resource element (RE) mapping block 3006a (for Case 1) or after the RE mapping per layer block 3006b (for Case 2). Other blocks shown in FIG. 3 include: broadcast beam block 3007; precoding and digital beamforming (BF) block 3008; and signal generation block 3009.

In the functional split option 7-2b shown in FIG. 3 for the downlink (e.g., LTE downlink) at the base-station, which is one functional split option for CRAN, the fronthaul interface bandwidth depends on the transmission mode and antenna ports. The fronthaul interface bandwidth is dependent on the number of antenna ports for transmission modes TM2-TM4 as defined by 3GPP LTE specifications, independent of the number of layers. The reference signals used in these transmission modes (TMs) are cell-specific. The fronthaul bandwidth is fixed for these transmission modes on the downlink based on the number of antenna ports. For transmission modes TM7-TM10, the fronthaul bandwidth is dependent on the number of layers, independent of the number of antenna ports. The fronthaul bandwidth is variable for these transmission modes based on the number of layers transmitted to the UE.

In one example embodiment according to the present disclosure, the precoding function is moved to the RU for TM1-TM6 in the downlink (as in functional split option 7-2). In order to support precoding at the RU for TM1-TM6, the following aspects need to be considered: transmission schemes; open-loop spatial multiplexing (Cyclic Delay Diversity (CDD)); closed-loop spatial multiplexing (no CDD); transmit diversity; number of layers vs. number of antennas; codebook indications; cell-specific reference signal (CRS) support; resource element (RE) mapping. These aspects are merely exemplary and should not be considered limiting.

Figure 4:
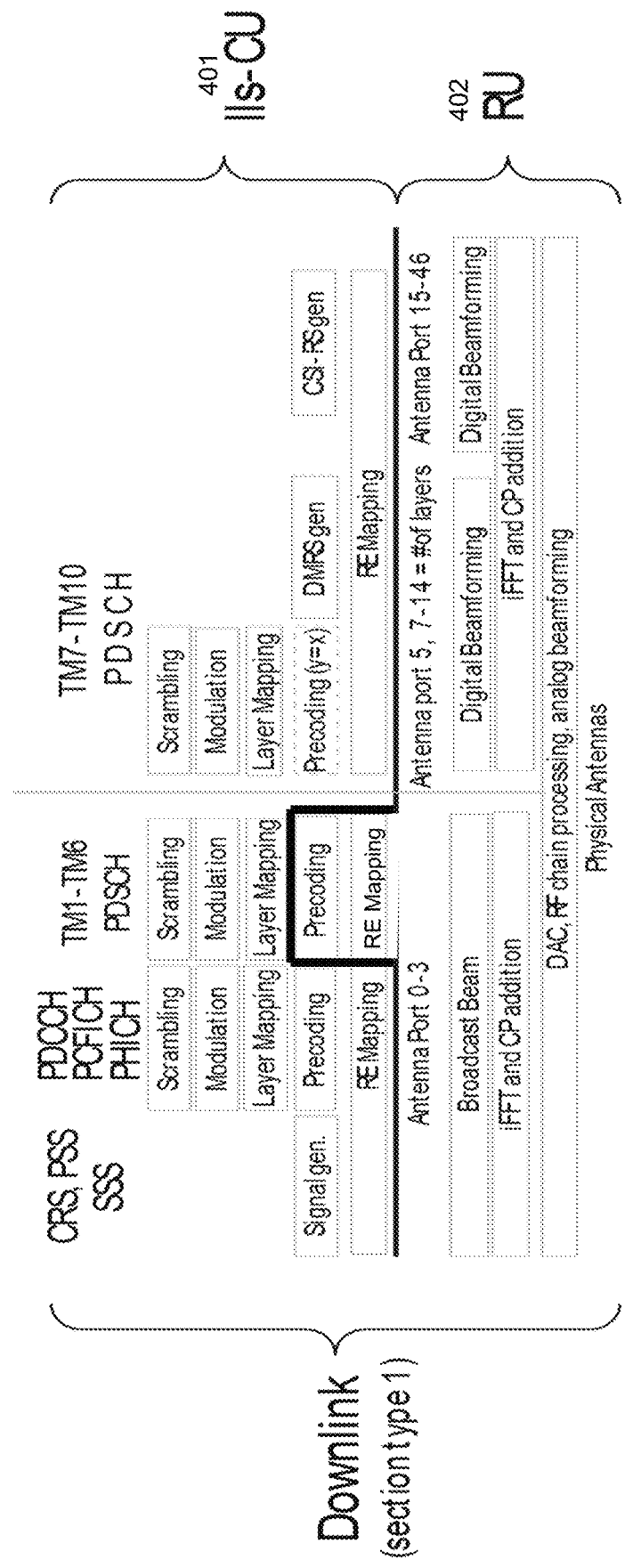
FIG. 4 illustrates the functional split for split option 7-2 in accordance with the present disclosure.

FIG. 4 shows the functional split for split option 7-2, e.g., for physical downlink shared channel (PDSCH) transmission (TM1-TM6), where the precoding and RE mapping are moved to the RU 402 from the lower-layer split central unit (LLS-CU) 401. Lower-layer split central unit refers to a BBU configuration according to functional split option 7 shown in FIG. 2, in which option a part of the physical layer function (labeled "Low-PHY") and RF are in the radio unit, while upper layers are in the central unit (i.e., BBU), and refers more specifically to BBU configuration according to the functional split option 7-2b (also referred to as option 7-2x). The precoder codebook matrices are assumed to be stored in the RU for different modes. A new section type is created for this mode of operation. In this section type, the following information is transmitted for different UEs: number of layers used; and the transmission scheme.

Next, reference signal transmission will be described in connection with FIG. 5. Reference signals are transmitted per antenna port as per currently supported in xRAN specification v1.0. A "storeRE" (store resource element) flag is added to the control (C)-plane message (e.g., from BBU to RU) to indicate that the associated U-plane data in this transmission contains reference signals and is to be stored locally (e.g., at RU) based on the subframe, symbol, xRAN resource block (XRB) and/or resource element (RE). The location(s) of the reference signals are indicated by using resource element mask (reMask). The locally stored (e.g., stored at RU) reference signals are automatically inserted (e.g., in RU transmissions) with the data at the appropriate subframe, symbol, XRB and RE. To update the reference signals, the "storeRE" flag is enabled with new contents and new reMask. All previous information for this XRB is invalidated. When storeRE is 1, number of layers is equal to number of antenna ports. Any update to reference signals will be sent as stand-alone packets using section type x and will not be combined with any other user's information.

This mode of reference signal transmission offers several advantages. First, it enables data to be sent in functional split option 7-2 as layers without having to figure out the multiplexing with reference signals over the interface. Second, no re-transmissions of reference signals over the fronthaul are required unless they need to be updated. Third, in idle mode, there is no need to send continuous empty RBs with reference signals with zeros for the in-phase/quadrature (I/Q) frequency domain data. Fourth, separation of reference signals from data allows for better compression options for the data, since constellations can be determined to come from a known set and have the same average power levels.

Figure 5:
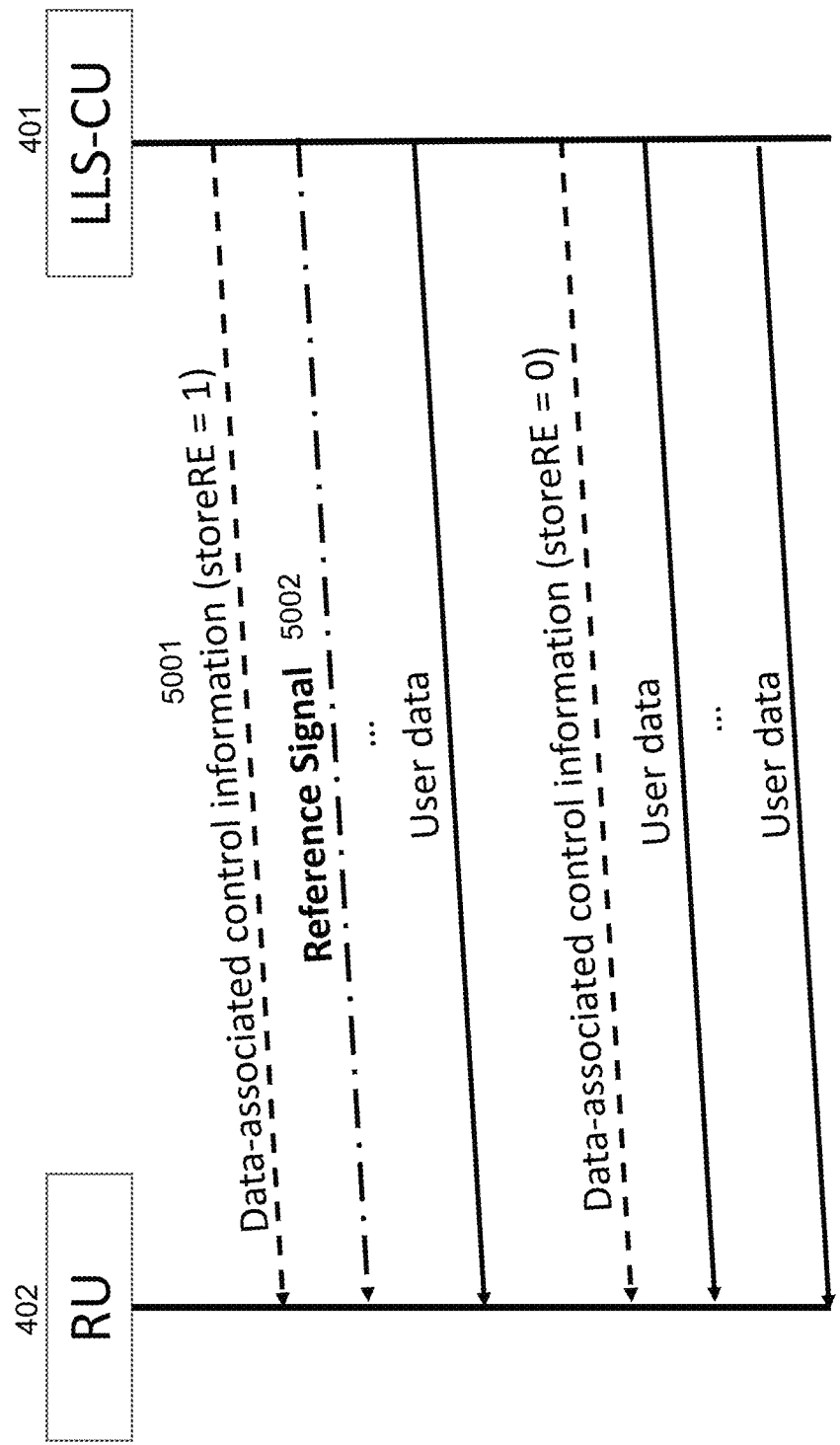
FIG. 5 illustrates the transmission of reference signals from a central unit to a radio unit.

FIG. 5 shows the transmission of reference signals (shown as 5002) from the lower-layer split central unit (LLS-CU) 401 to the RU 402, where the reference signals are cached using storeRE bit to 1 in the C-plane message (shown as 5001). These reference signals are not transmitted on the fronthaul (e.g., from BBU to RU) until there is a need to update the reference signals. In accordance with the present disclosure, the reference signals are sent once to the RU 402, and the RU 402 caches the reference signals for the appropriate symbols and subframes for each antenna port. Every time the RU receives the latest reference signal from the BBU, the RU overwrites the existing local cache of the reference signal with the latest reference signal from the BBU. In idle mode use case, there is no downlink transmission required on the fronthaul for reference signal transmissions, except for broadcast transmissions, e.g., master information block (MIB) and/or system information block (SIB).

A storeRE bit (or flag) is used in the sectionType to indicate whether the transmission is for reference signals (storeRE bit set to 1) or data (storeRE bit set to 0). The reference signals cached by RU are then automatically inserted in all RU transmissions based on the symbol and subframes indicated. The lower-layer split central unit (LLS-CU) 401 can update the reference signals to the RU 402 for any changes in value/power if necessary at any time using the flag. This can be implemented by a multiplexer at the IFFT input based on the symbol and sub-frame. This feature can be used for primary synchronization signal (PSS) and/or secondary synchronization signal (SSS) as well.

In an example embodiment of the present disclosure, a new section type for precoding for TM1-TM6 at RU is provided. The precoding matrices (the precoding matrix for downlink spatial multiplexing W, the matrix for supporting cyclic delay diversity D, the matrix to spread energy among the transmission layers U as defined in 3GPP TS 36.211 for precoding) are stored in the RU, which will perform the precoding. The number of CRS ports is based on the number of antenna ports which is exchanged over the management plane (M-plane). The symbol index (i) which defines the number of modulation symbols per layer as per 3GPP TS 36.211 in TM3 is reset per section ID and auto-incremented inside the RU. The beamId field is re-purposed for indicating the codebook index and the number of layers in this mode. For TM3, the codebook index is set to "0" and is not used for open-loop precoding. For TM4, the codebook index as defined in 3GPP TS36.211 is transmitted over the fronthaul interface.

In an example embodiment of the present disclosure, for each UE, a new sectionID is used since different UEs can have different transmission schemes. More than 1 sectionID per UE is possible in closed loop spatial multiplexing to support sub-band precoding. For transmit diversity mode, the REs from multiple layers are packed into an RB for efficient transmission—we do not send different evolved common public radio interface (eCPRI) real time control data message series identifier (ecpriRtcID) for each layer in this case.

In an example embodiment of the present disclosure, the beamId field can be re-purposed to indicate: precoder codebook; the number of layers; and the transmission scheme.

Since different layers are conveyed in different eCPRI messages for non-diversity modes, all parameters (except ecpriRtcId) are kept similar for precoding support at the RU. For transmit (Tx) diversity mode, all the layers output are packed as 12 REs, and a single ecpriRtcId is used in this case.

For all layers that are multiplexed in open loop and closed loop modes, different ecpriRtcIDs and eCPRI in-phase/quadrature (IQ) data transfer message series identifiers (ecpriPcIDs) are used for each layer. All control (C)-plane message parameters are kept same for precoding purposes. For transmit diversity mode, a single ecpriRtcID and a single ecpriPcID are used, and information for all layers are packed into an xRAN resource block (XRB) for transmission and are unpacked at the RU.

Next, the frame format for transmission of this information on the fronthaul is described below. In accordance with an example embodiment of the present disclosure, a new C-plane section type is added (Section Type "x") for precoding at RU. There is no change in the eCPRI layer. Each UE uses a different sectionID so that the layers and the transmission scheme per UE can be differentiated. More than 1 sectionID per UE can be implemented in closed loop spatial multiplexing to support sub-band precoding. Section Type "'x" fields are defined as follows:

Common Header fields:
  dataDirection (data direction (gNB Tx/Rx)) field: 1 bit
    value="1" shall be set "Tx"
  payloadVersion (payload version) field: 3 bits
    value="1" shall be set ($1^{st}$ protocol version for payload and time reference format)
  filterIndex (filter index) field: 4 bits
  frameId (frame identifier) field: 8 bits
  subframeId (subframe identifier) field: 4 bits
  slotID (slot identifier) field: 6 bits
  startSymbolId (start symbol id) field: 6 bits
  numberOfsections (number of sections) field: 8 bits
  sectionType (section type) field: 8 bits
    value="x" shall be set
  udCompHdr (user data compression header) field: 8 bits
  reserved (reserved for future use) field: 8 bits
Section fields:
  sectionId (section identifier) field: 12 bits
  rb (resource block identifier) field: 1 bit
  symInc (symbol number increment command) field: 1 bit
  startXrbc (starting XRB of control section) field: 10 bits
  numXrbc (number of contiguous XRBs per control section) field: 8 bits
  reMask (resource element mask) field: 12 bits
  numSymbol (number of symbols) field: 4 bits
  transmissionScheme (scheme used for transmission): 2 bits
  numLayers (number of layers) field: 2 bits
  codebookIndex (precoder codebook index) field: 4 bits
  storeRE (store ref signal RE in RU): 1 bit
Detailed explanation of selected section fields:
  numLayers (number of layers used for DL transmission)
    Description: This parameter defines the number of layers that are used for DL transmission in TM1-TM6.
    Value range: {00b-11b}. 00b implies 1 layer, and 11b implies 4 layers.
    Type: unsigned integer.
    Field length: 2 bits.
  codebookIndex (precoder codebook used for transmission)
    Description: This parameter defines the index of the precoder codebook that are used for transmission in TM1-6. It is to be used in conjunction with the numLayers field.
    Value range: {0000b-1111b}.
    Type: unsigned integer.
    Field length: 4 bits.
  Transmission scheme (LTE transmission scheme)
    Description: This parameter defines the TM scheme used in this section type.
    Value range: {00b-10b} 00b: Spatial multiplexing (CDD) 01b—spatial multiplexing (no CDD), 10b—transmit diversity.
    Type: unsigned integer.
    Field length: 2 bits.
  StoreRE (store reference signal in RU)
    Description: This parameter is used to indicate that the U-plane data enabled by the reMask field should be stored in RU, and any previous storage is invalidated.
    Value range: 0: disable, 1: enable
    Type: binary.
    Field length: 1 bit.

A description of U-plane implementation improvement is provided herein. Section type "1'" can be re-used in U-plane. In accordance with an example embodiment of the present disclosure, instead of always sending 12 REs, reference signals that were indicated by reMask for storage in RU are now omitted for transmission on the fronthaul interface. RU is configured to understand that for this particular section type ("1"), RU should read fewer REs than 12 when reference signals are used in that XRB. In idle mode, reference signals are automatically inserted at appropriate locations and time instances, and no U-plane DL transmissions over the fronthaul is required.

Figure 6:
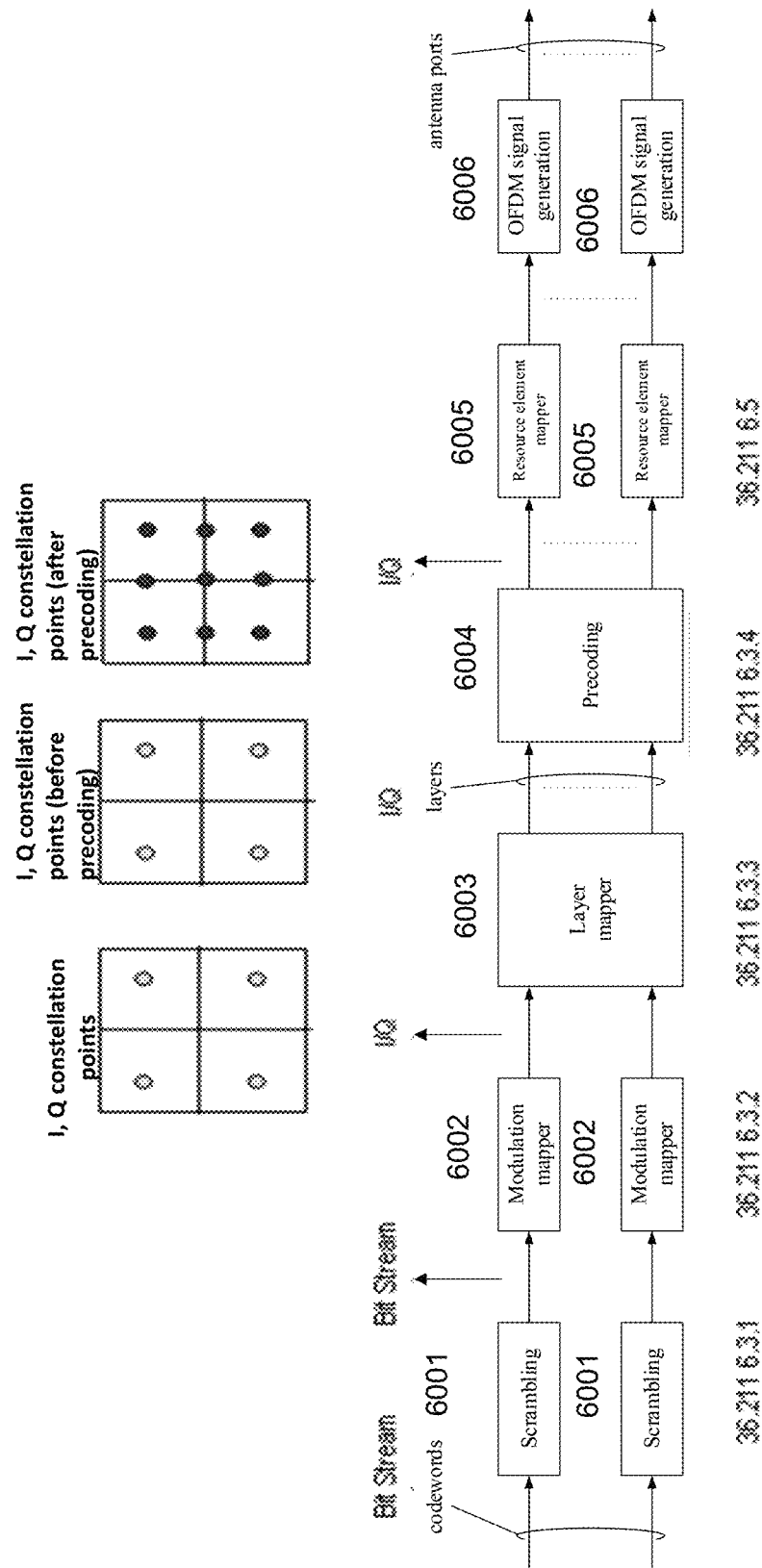
FIG. 6 illustrates the data flow in the downlink (DL) physical layer (PHY) processing.

Described below are details of compression of fronthaul data. In one example embodiment of the present disclosure, a constellation-index-based compression is implemented. FIG. 6 shows the data flow in the DL PHY processing, including: bit stream processed by the scrambling block 6001 are subsequently processed by the modulation mapper 6002 to generate I/Q constellation points; I/Q constellation points processed by layer mapper 6003 are subject to precoding by the precoding block 6004; I/Q constellation points after precoding by the precoding block 6004 are processed by resource element mapper 6005, followed by processing by OFDM signal generation block 6006 and transmission via antenna ports. As shown in FIG. 6, the modulation mapper 6002 takes the bit streams and maps them into in-phase/quadrature (I/Q) values to form a constellation. After modulation mapping by the modulation mapper 6002, a layer mapping is applied in 6003, where the data is mapped on layers to be transmitted. The layers are then precoded in 6004 to map to antenna ports. During the process of precoding, the numbers can grow in bit-width from few bits (depending on the modulation mode) to a floating-point complex number (that can be quantized). However, instead of sending I/Q values, the constellation indices are transmitted in this compression scheme. This scheme is used for downlink compression only. It translates the normalized constellation points on the fronthaul interface into an index for transmission. At the RU, the constellation indices are mapped back into I, Q values and scaled by the scalar field used in the user data compression method (udCompMethod). It works for cases where there is no impact on the constellations in the lower-layer split Central Unit (LLS-CU), e.g., TM7-TM10, where precoding is done in the RU, and for 5G NR where demodulation reference signal (DMRS) precoding is used.

Figure 7:
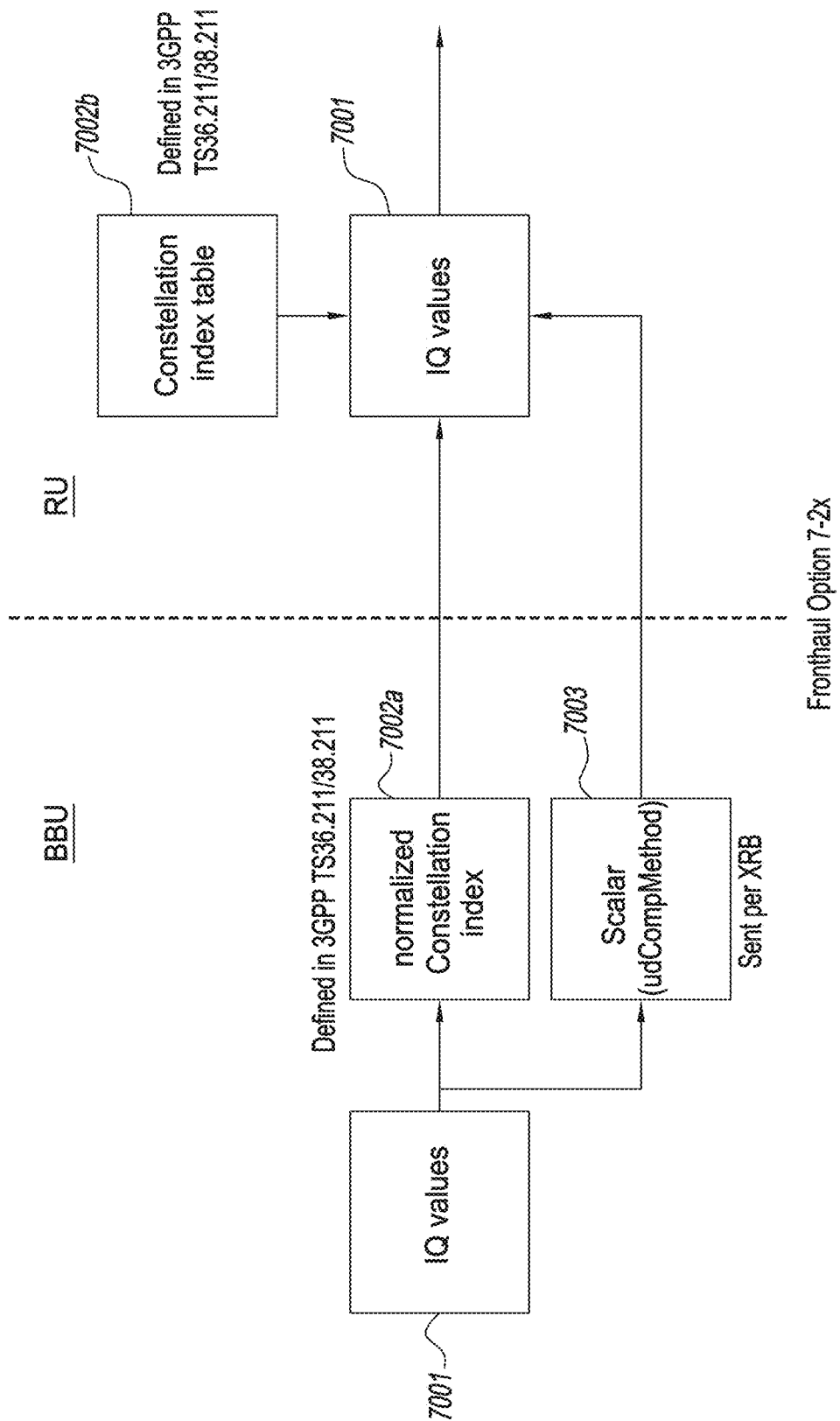
FIG. 7 illustrates an example compression method according to the present disclosure.

FIG. 7 illustrates an example of the compression method according to the present disclosure. The I/Q values (referenced as 7001) are separated into a normalized constellation index 7002a and a scalar field 7003 (e.g., as defined in block scaling in udCompMethod). The normalized constellation index used for transmission is based on the constellation mapping (index) table as defined in 3GPP 36.211 for LTE and 3GPP 38.211 for NR. The scalar field 7003 and the normalized constellation index 7002*a* are transmitted over the fronthaul. The RU recreates the IQ values 7001 from the scalar field and the constellation index table 7002*b* which is known to the RU.

FIG. 8 shows an example table for 16-quadrature amplitude modulation (QAM) constellation mapping according to the present disclosure. In this example, the constellation index b(n), b(n+1), b(n+2), b(n+3) is transmitted instead of the (floating point) IQ values for 16-QAM.

The example compression method described in connection with FIGS. 6, 7 and 8 is subject to the following conditions: bock scalar compression mode is used; DL transmission is used; and there is no precoding done at LLS-CU. In addition, the bit width for the data is set according to the modulationType, e.g., quadrature phase shift keying (QPSK) implies 2 bits are used (1-bit I, 1-bit Q), and 16-QAM implies 4-bits are used.

In an example method according to the present disclosure, all reference signals in DL are QPSK-based except for PSS/SSS and physical hybrid ARQ indicator channel (PHICH) (−1,0,1). The bit-width for the QPSK-based reference signals can be fixed to 2 bits (1-bit I, 1-bit Q), as shown in option 1 of FIG. 9. The bit-width for the reference signals could also be zero padded if necessary to match data bit-width, as shown in option 2 of FIG. 9. Another solution, option 3 shown in FIG. 9, is to send reference signals separately with separate compression. In this case, storeRE is made generic for all modes. To determine the location of reference signals, a 12-bit field similar to reMask can be used in this mode (i.e., sending reference signals separately with separate compression). For PHICH, 2 bits are used (−1→10, 0→00, 1→01, 11→reserved) for I and Q. For PSS/SSS, there is no issue since it occupies all the 12 REs in the RB and can be sent separately with a different compression scheme.

The scalar in the block scalar compression mode is used for de-normalizing the data constellation points. The scaling for the reference signals can be done in multiple ways: add M-plane message which sets scaling for reference signals; send reference signals separately and reference signals are compressed independently; and add another field for the scaling for de-normalizing reference signals in the RB. Any remaining data needed to create octet boundaries can be filled with zeros and ignored.

The example methods according to the present disclosure provide significant compression for the fronthaul, and can be extended to TM1-TMs modes as well as for small constellation sizes. For example, as shown in FIG. 10, which illustrates various cases of QPSK and 16-QAM modulations for TM3, it is readily apparent that QPSK and 16-QAM modes do not expand significantly even after precoding, e.g., QPSK uses 9 constellation points (expanded from 2 points) after precoding in TM3.

In an example embodiment according to the present disclosure, in order to make efficient use of the compression, the reference signals can be transmitted separately from the data and not included in the transmission message.

In another example embodiment, for the case in which is a transformation of the constellation points occurs, e.g., when precoding is done for TM4 in the BBU, the constellation points are indexed using "b" bits from <000 . . . 0> bits as the bottom left of the constellation and incremented along the row first, followed by incrementing the column. The number "b"=log 2(number of constellation points) is conveyed on the fronthaul interface based on the modulation, the transmission mode and the number of antennas used.

For new radio (NR), the transmission mode field is set as "0000" (reserved) since cell-specific reference signal (CRS)-based precoding is not supported and the constellation mapping is as defined in 3GPP TS38.211.

Figure 11:
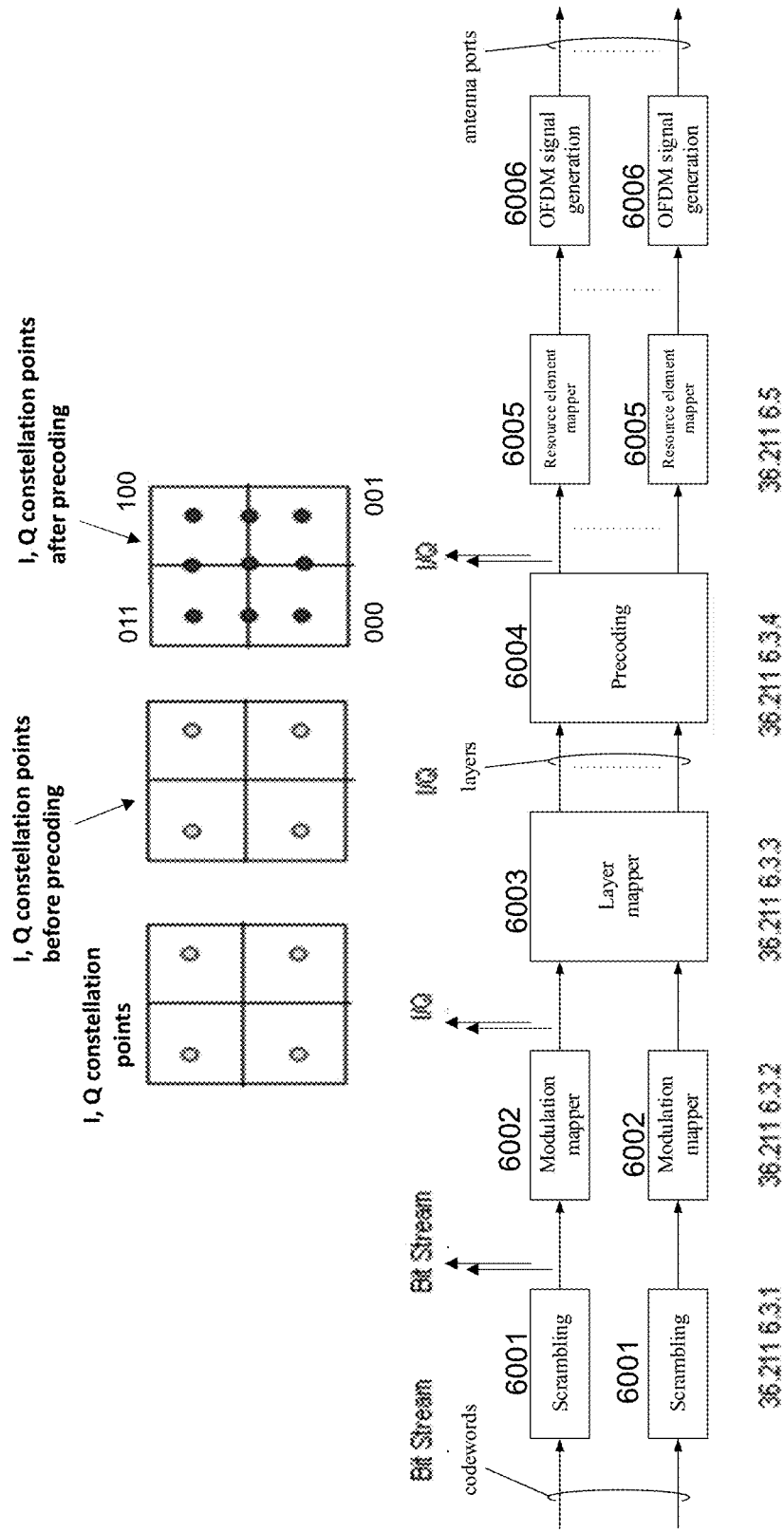
FIG. 11 illustrates an example data flow in which the output after precoding is mapped from 0000 to 1000 on the fronthaul interface.

FIG. 11 illustrates an example data flow (substantially corresponding to the data flow shown in FIG. 6) in which, for TM4 using QPSK, the output after precoding is mapped from 0000 to 1000 on the fronthaul interface.

In one example embodiment according to the present disclosure, the block scaling compression method can be further enhanced to support the constellation mode. This mode is set explicitly instead of assuming it will be automatically used, e.g., by allocating 1 bit in the header field. In addition, the scalar field in the header can be increased to 15 bits (support 2 octets instead of 1 octet, where 1 bit is used to set the constellationIndex mode and 15 bits are used to support the scalar mode). This is shown as option 1 in FIG. 12. Alternatively, instead of using the block scaling compression method, a new compression mode can also be considered for this purpose, e.g., option 2 shown in FIG. 12. In the example shown in FIG. 12, the user data compression parameter (udCompParam) compression header needs to be sent only once per sectionID, as opposed to other compression methods in which it is sent per XRB.

Next, details of narrow band Internet of things (NB-IoT) support will be described, e.g., physical random access channel (PRACH) support and physical uplink shared channel (PUSCH) support. One narrow band Internet of things (NB-IoT) physical random access channel (NPRACH) preamble consists of 4 symbol groups, with each symbol group comprising of one cyclic prefix (CP) and 5 symbols. The CP length is 66.67 μs (Format 0) for cell radius up to 10 km and 266.7 μs (Format 1) for cell radius up to 40 km. Each symbol, with fixed symbol value 1, is modulated on a 3.75 kHz tone with symbol duration of 266.67 μs. However, the tone frequency index changes from one symbol group to another (single tone hopping). This requires a 3.75 KHz PRACH spacing with 1 to 48 PRACH subcarriers in 1 RB.

In NB-IoT, UE is configured with 48 subcarriers (1 RB) for NPRACH at maximum, and UE selects one of the subcarriers for random access (RA) preamble transmission. Thus, the minimum and maximum filters for NB-IoT is as follows: minimum=3.75 kHz; and maximum=180 kHz (=3.75 kHz*48). Since the network (NW) configuration dictates how many subcarriers are configured for NPRACH, 48 patterns of filters can be needed. In an example embodiment of a method according to the present disclosure, support of PRACH for NB-IoT is provided, in which all 48 subcarriers (180 KHz) are sent for PRACH and the LLS-CU decides on the PRACH tone locations.

Regarding PUSCH support for NB-IoT, single and multi-tones formats are possible with transmissions of 1, 3, and 6 frequency tones on the PUSCH. Frequency tone is an orthogonal frequency-division multiplexing (OFDM) subcarrier which is one I,Q frequency domain data sample. In current extensible Radio Access Network (xRAN) specification, only 12 tones can be supported. In accordance with the present disclosure, a packed RE format is supported for cases where the fronthaul data does not align to RB boundaries. In such cases, "P" RE's are transmitted, where 1<=P<=12 and P is indicated as the value of a numRE parameter, i.e., the parameter that defines the number of REs used in an XRB.

In one example embodiment of the present disclosure, as shown in FIG. 13, the transmission of numRE parameter value P is done for NB-IoT over the management plane when the change for P is not dynamic. In accordance with the present disclosure, numRE parameter has the following characteristics: value range of {0001b-1100b}; type—an unsigned integer; field length of 4 bits.

Figure 14:
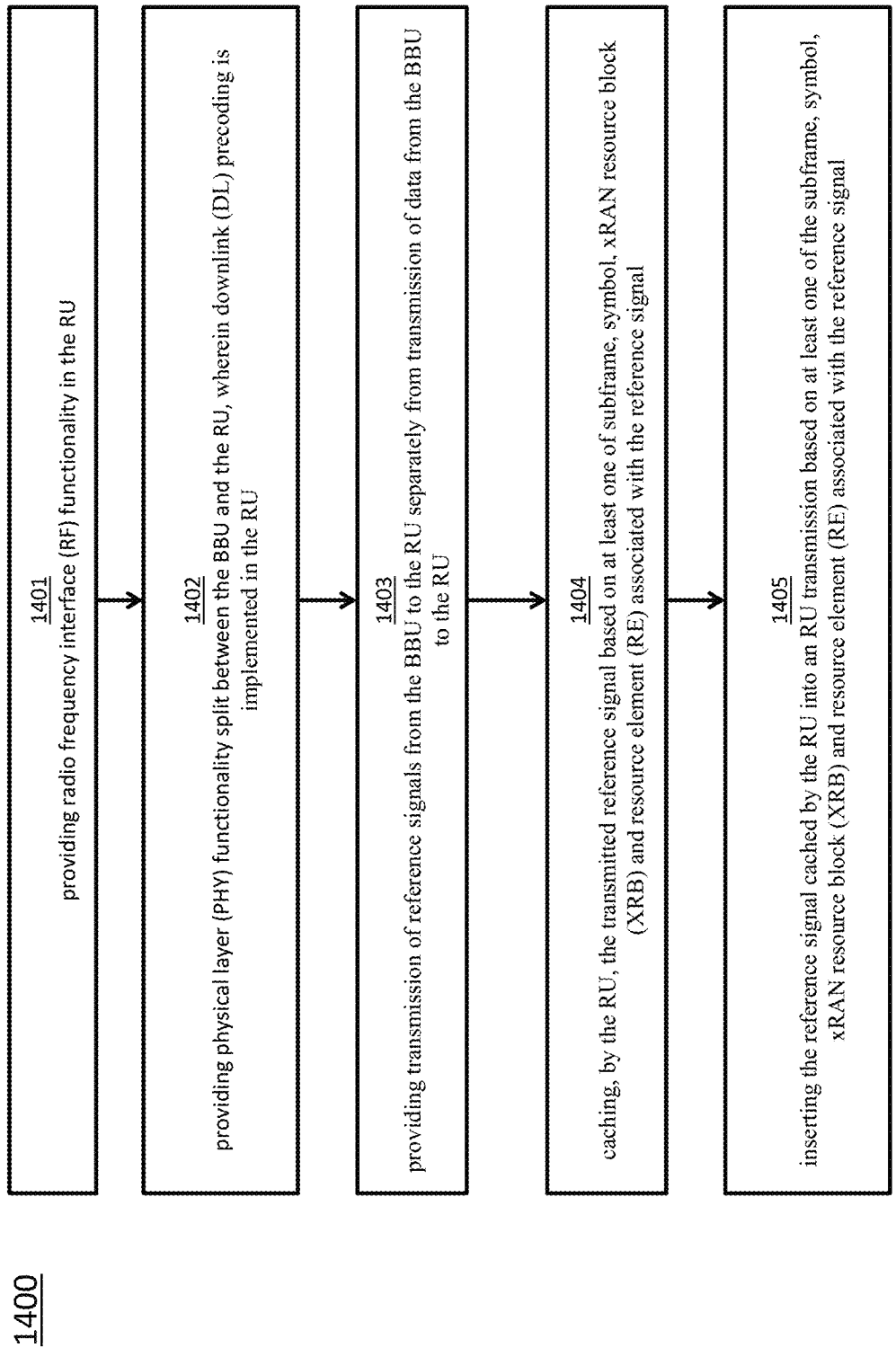
FIG. 14 illustrates a logic flow chart of an example method for providing a fronthaul interface in a cloud radio access network (CRAN).

FIG. 14 illustrates a logic flow 1400 of an example method for providing a fronthaul interface in a cloud radio access network (CRAN) having a baseband unit (BBU) and at least one radio unit (RU) remote from the BBU. Block 1401 includes providing radio frequency interface (RF) functionality in the RU. Block 1402 includes providing physical layer (PHY) functionality split between the BBU and the RU, including downlink (DL) resource element mapping and DL precoding implemented in the RU. Block 1403 includes providing transmission of reference signals from the BBU to the RU separately from transmission of data from the BBU to the RU. Block 1404 includes caching, by the RU, the transmitted reference signal based on at least one of subframe, symbol, xRAN resource block (XRB) and resource element (RE) associated with the reference signals. Block 1405 includes inserting the reference signal cached by the RU into an RU transmission based on at least one of the subframe, symbol, xRAN resource block (XRB) and resource element (RE) associated with the reference signal (e.g., in one example embodiment, signal insertion is based on the subframe, symbol, XRB and RE).

Figure 15:
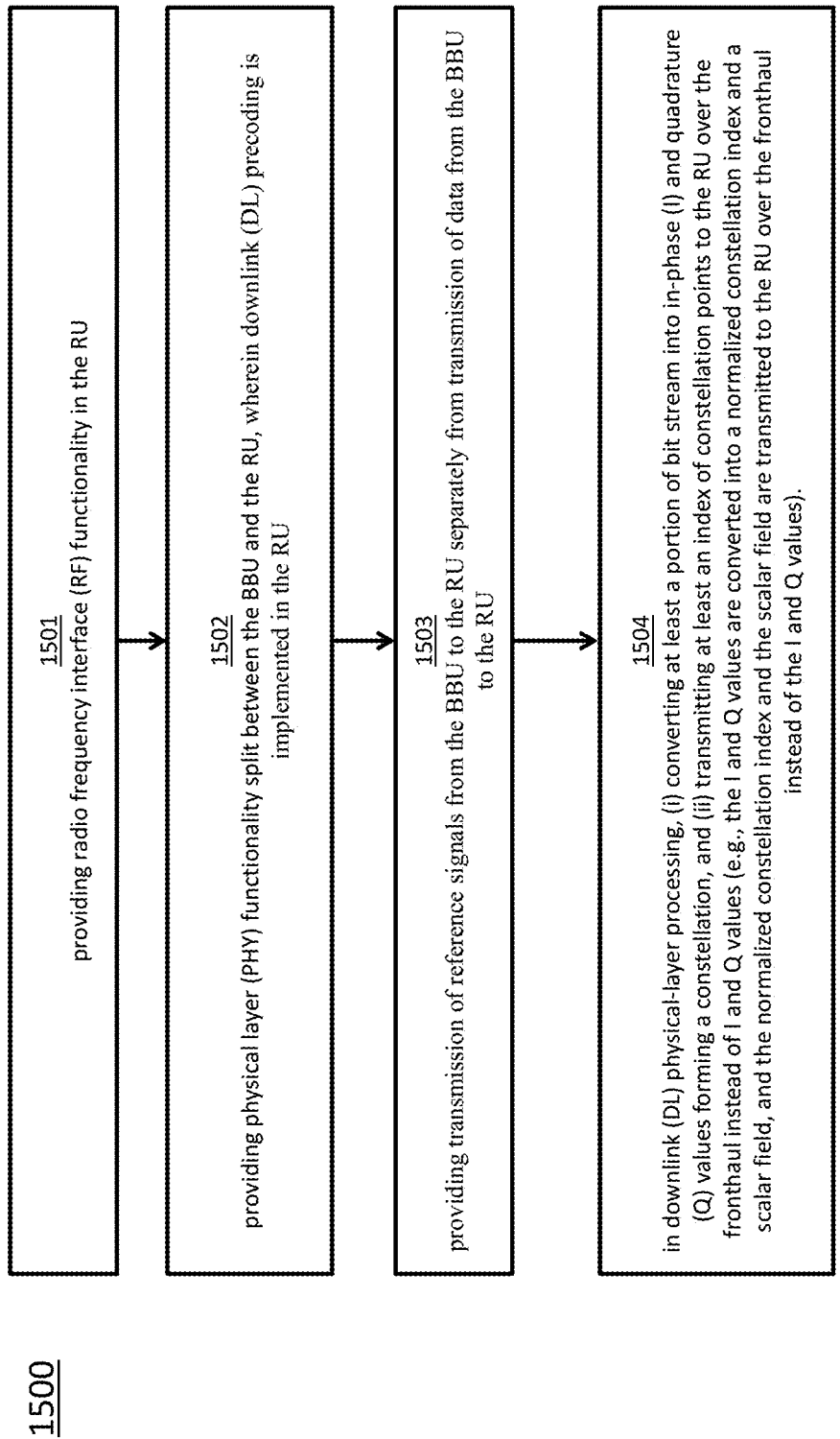
FIG. 15 illustrates a logic flow chart of another example method for providing a fronthaul interface in a CRAN.

FIG. 15 illustrates a logic flow 1500 of an example method for providing a fronthaul interface in a cloud radio access network (CRAN) having a baseband unit (BBU) and at least one radio unit (RU) remote from the BBU. Block 1501 includes providing radio frequency interface (RF) functionality in the RU. Block 1502 includes providing physical layer (PHY) functionality split between the BBU and the RU, including downlink (DL) resource element mapping and DL precoding implemented in the RU. Block 1503 includes providing transmission of reference signals from the BBU to the RU separately from transmission of data from the BBU to the RU. Block 1504 includes: in downlink (DL) physical-layer processing, (i) converting at least a portion of bit stream into in-phase (I) and quadrature (Q) values forming a constellation, and (ii) transmitting at least an index of constellation points to the RU over the fronthaul instead of I and Q values (e.g., the I and Q values are converted into a normalized constellation index and a scalar field, and the normalized constellation index and the scalar field are transmitted to the RU over the fronthaul instead of the I and Q values).

Figure 16:
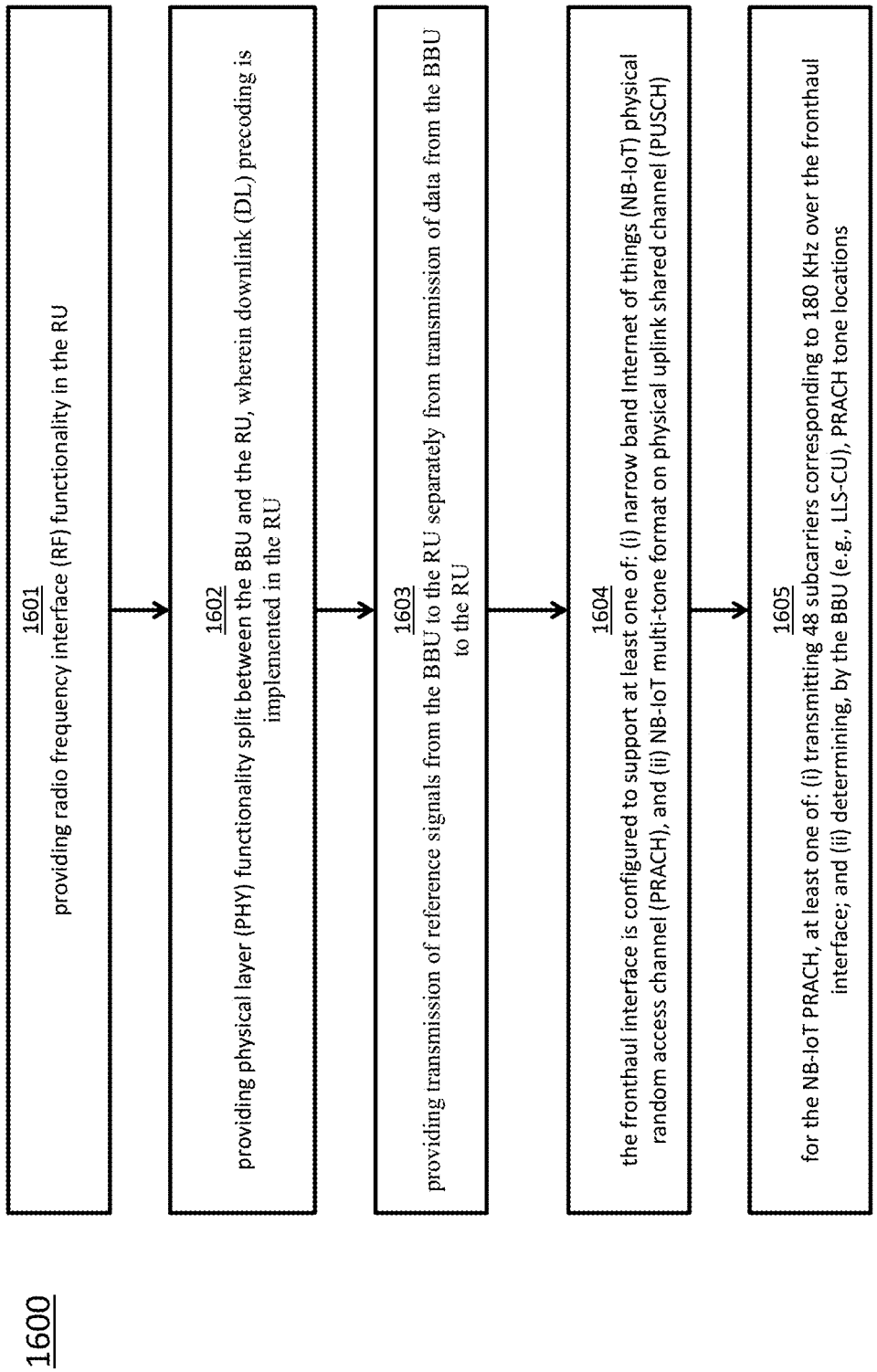
FIG. 16 illustrates a logic flow chart of another example method for providing a fronthaul interface in a CRAN.

FIG. 16 illustrates a logic flow 1600 of an example method for providing a fronthaul interface in a cloud radio access network (CRAN) having a baseband unit (BBU) and at least one radio unit (RU) remote from the BBU. Block 1601 includes providing radio frequency interface (RF) functionality in the RU. Block 1602 includes providing physical layer (PHY) functionality split between the BBU and the RU, including downlink (DL) resource element mapping and DL precoding implemented in the RU. Block 1603 includes providing transmission of reference signals from the BBU to the RU separately from transmission of data from the BBU to the RU. At block 1604, the fronthaul interface is configured to support at least one of: (i) narrow band Internet of things (NB-IoT) physical random access channel (PRACH), and (ii) NB-IoT multi-tone format on physical uplink shared channel (PUSCH). Block 1605 includes: for the NB-IoT PRACH, at least one of: (i) transmitting 48 subcarriers corresponding to 180 KHz over the fronthaul interface; and (ii) determining, by the BBU (e.g., LLS-CU), PRACH tone locations.

Figure 17:
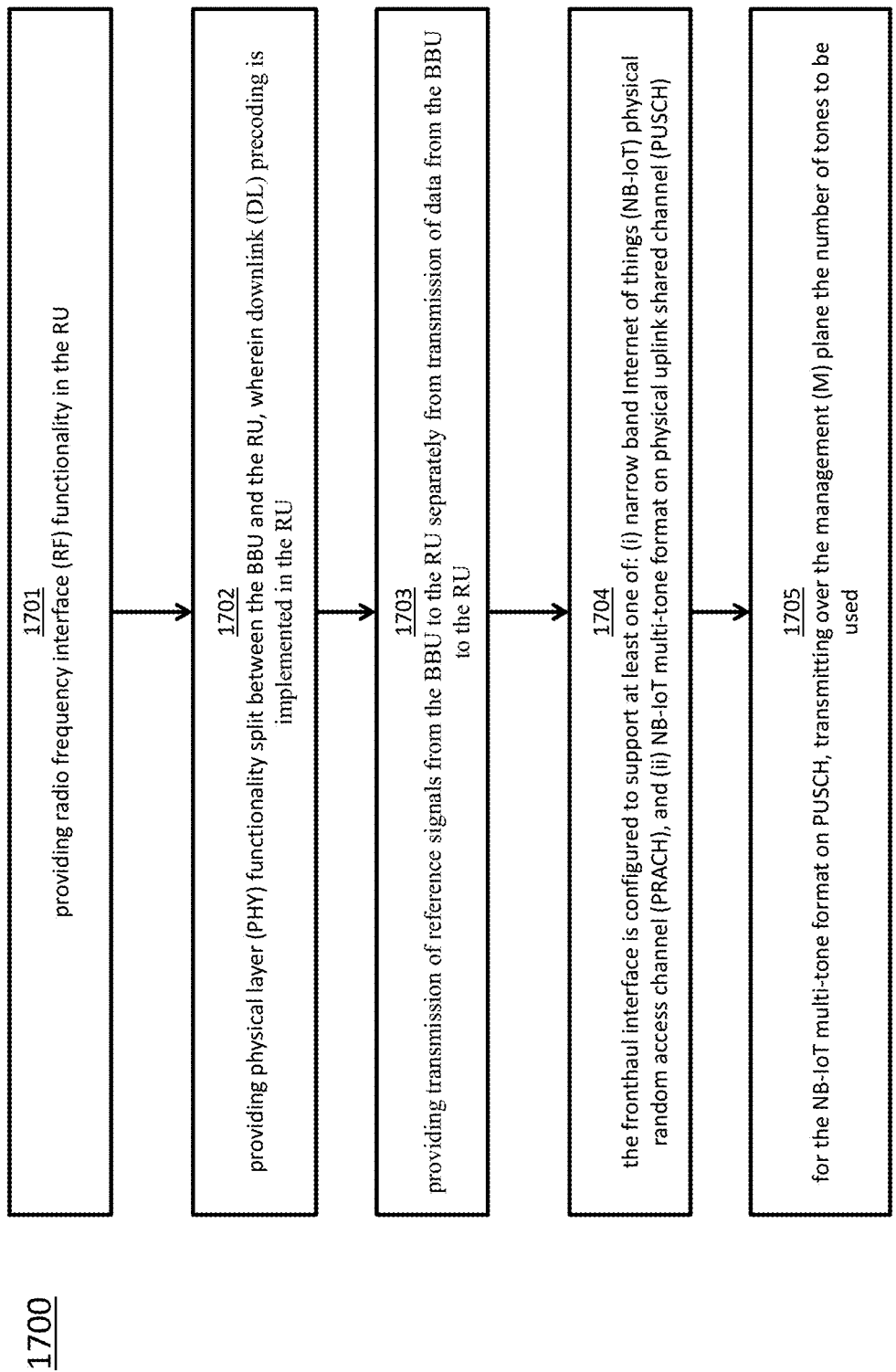
FIG. 17 illustrates a logic flow chart of yet another example method for providing a fronthaul interface in a CRAN.

FIG. 17 illustrates a logic flow 1700 of an example method for providing a fronthaul interface in a cloud radio access network (CRAN) having a baseband unit (BBU) and at least one radio unit (RU) remote from the BBU. Block 1701 includes providing radio frequency interface (RF) functionality in the RU. Block 1702 includes providing physical layer (PHY) functionality split between the BBU and the RU, including downlink (DL) resource element mapping and DL precoding implemented in the RU. Block 1703 includes providing transmission of reference signals from the BBU to the RU separately from transmission of data from the BBU to the RU. At block 1704, the fronthaul interface is configured to support at least one of: (i) narrow band Internet of things (NB-IoT) physical random access channel (PRACH), and (ii) NB-IoT multi-tone format on physical uplink shared channel (PUSCH). Block 1705 includes: for the NB-IoT multi-tone format on PUSCH, transmitting over the management (M) plane the number of tones to be used.

The example embodiments according to the present disclosure can be implemented primarily in software (e.g., stored on computer-readable medium) or, in the alternative, in hardware using, for example, hardware components such as application specific integrated circuits (ASICs). Implementation of the hardware state machine so as to perform the functions described herein will be apparent to persons skilled in the relevant art(s). Alternatively, the example embodiments according to the present disclosure can be implemented using a combination of both hardware and software.

While various example embodiments of the present disclosure have been described above, the example embodiments are merely exemplary and should not be interpreted as limiting. It will be apparent to persons skilled in the relevant art(s) that various changes in form and detail can be made therein, and these variations are fully encompassed by the present disclosure.

In this document, the term "computer-readable medium" generally refers to media such as removable storage drive, a hard disk installed in hard disk drive, volatile memory or non-volatile memory, removable or non-removable memory, erasable or non-erasable memory, writeable or re-writeable memory, and the like, which media serve as storage for computer programs that can be provided to, and executed by, computer systems. Computer programs can also be received via a communications interface. Computer programs, when executed, enable the computer system to perform the features of the present invention, as discussed herein. In particular, the computer programs, when executed, enable a processor to perform the features of the example embodiments of the present disclosure. Some examples of computer-executable instructions can include suitable type of code, e.g., source code, compiled code, interpreted code, executable code, static code, dynamic code, object-oriented code, visual code, and the like. The examples are not limited in this context.

The techniques and embodiments described herein are exemplary, and should not be construed as implying any specific limitation on the present disclosure. It should be understood that various alternatives, combinations and modifications could be devised by those skilled in the art. For example, steps associated with the processes described herein can be performed in any order, unless otherwise specified or dictated by the steps themselves. The above description is illustrative, and is not intended to be restrictive. One of ordinary skill in the art may make numerous modifications and/or changes without departing from the general scope of the disclosure. For example, and as has been described, the above-described embodiments (and/or aspects thereof) may be used in combination with each other. Additionally, portions of the above-described embodiments may be removed without departing from the scope of the disclosure. In addition, modifications may be made to adapt a particular situation or material to the teachings of the various embodiments without departing from their scope. Many other embodiments will also be apparent to those of skill in the art upon reviewing the above description. The present disclosure is intended to embrace all such alternatives, modifications and variances that fall within the scope of the appended claims.

The terms "comprise" or "comprising" are to be interpreted as specifying the presence of the stated features, integers, steps or components, but not precluding the presence of one or more other features, integers, steps or components or groups thereof. The terms "a" and "an" are indefinite articles, and as such, do not preclude embodiments having pluralities of articles.

Some embodiments may be described using the expression "one embodiment" or "an embodiment" along with their derivatives. These terms mean that a particular feature, structure, or characteristic described in connection with the embodiment is included in at least one embodiment. The appearances of the phrase "an embodiment" in various places in the specification are not necessarily all referring to the same embodiment.

GLOSSARY OF TERMS

Reference is made to Third Generation Partnership Project (3GPP) system, in accordance with embodiments of the present disclosure. The present disclosure employs abbreviations, terms and technology defined in accordance with Third Generation Partnership Project (3GPP) technology standards, including the following standards and definitions. 3GPP technical specifications (TS) and technical reports (TR), which are incorporated by reference in their entirety hereby, define the related terms and architecture reference models that follow.

3GPP: Third generation partnership project
ARQ: automatic repeat request
BUT: Baseband unit
Beam forming
BPSK: Binary Phase Shift Keying
BW: bandwidth.
CA: Carver aggregation.
CC: Component
CCA: Clear channel assessment
CCE: Control Channel Element(s)
CDD: Cyclic Delay Diversity
CMS: Centralized Management System
CoMP: coordinated multipoint transmission
COTS: Commercial off-the-shelf
CP: cyclic prefix
CPRI: common public radio interface
CQI: channel quality indicator
C-RAN: cloud radio access network
CRC: cyclic redundancy checking
CRS: Cell-specific reference signal
CSAT: Carrier-sense adaptive-transmission
CSI: Channel state information
   CSI-RS: Channel state information-reference signal
CU: Central unit
CWDM: Coarse wavelength division multiplexing
DCI: downlink control indicator
DFS: Dynamic frequency selection
DM-RS: Demodulation-reference signal
DRS: Discovery Reference Signals
DMTC: discovery measurement timing configuration
DL: downlink
   DL-RB: down link resource block
DU: Distribution unit
eCPRI: evolved common public radio interface
ecpriPcId: eCPRI IQ data transfer message series identifier
ecpriRtcID: eCPRI real time control data message series identifier
EPC: Evolved Packet Core
E-UTRA: Evolved Universal Terrestrial Radio Access
eNB: Evolved Node B
MD: Frequency-division duplex
FD-MIMO: full dimension multiple input, multiple output
FEC: forward error correction
FFT: Fast Fourier Transform
GbE: Gigabit Ethernet
gNB: g node B
HARQ: hybrid automatic repeat request
HARQI: hybrid automatic repeat request information
iFFT: inverse Fast Fourier Transform
IoT: Internet of things
I/Q: in-phase/quadrature
ISM radio bands: industrial, scientific and medical radio bands
JP: joint processing
JR: joint reception
KPI: key performance indicator
LAA: licensed-assisted access
LBT: Listen-before talk
LCM: life cycle management
LDS: LTE-U discovery signal
LLS-CU: lower-layer-split central unit
LTE: long term evolution
LTE-A: LTE Advanced
LTE-U: LTE-unlicensed
MAC: Media Access Control
MBSFN: Multicast-broadcast single-frequency network
MCS: modulation and coding scheme
MIB: Master Information Block
MIMO: multiple input, multiple output
MMSE-IRC: Minimum mean square error-interference rejection combining
MMSE-MRC: Minimum mean square error-maximum-ratio combining
mmWave: millimeter wave
MNO: Mobile network operator
M-Plane: Management plane
NB-IoT: narrow band Internet of things
NR: New radio
OAM: Operation and management
O-RAN: Open Radio Access Network
OSS: operator service system
PBCH: Physical Broadcast Channel
PCFICH: Physical Control Format Indicator Channel
PDCCH: Physical downlink Control Channel
PDCP: Packet Data Convergence Protocol
PDSCH: physical downlink shared channel
PHICH: Physical Hybrid ARQ Indicator Channel
PHY: physical layer
   LPHY: lower physical layer
   UPHY: upper physical layer
PNF: Physical Network Function
PRB: physical resource block P-SS: Primary Synchronization Signal
PUCCH: Physical Uplink Control Channel
PUSCH: Physical Uplink Shared Channel
QAM: quadrature amplitude modulation
QPSK: Quadrature Phase Shift Keying
RACH: random access channel
   PRACH: physical random access channel
   NPRACH: NB-IoT physical random access channel
RB: resource block
RE: resource element
   reMask: resource element mask
REST API: Representational State Transfer Application Programming Interface
RF: radio frequency interface
RI: rank indicator
RLC: Radio Link Control
RRC: Radio Resource Control
RRH: Remote Radio Head
RRM: Radio resource management
RRU: Remote radio unit
RS: reference signal
RSSI: received signal strength indicator
SCell: Secondary cell
SDAP: Service Data Adaptation Protocol
SIB: System Information Block
SIMO: single input, multiple output
SINR: signal-to-interference-plus-noise ratio
SNR: signal-to-noise ratio
SON: Self-Organizing Network
SRS: Sounding reference signal
S-SS: Secondary Synchronization Signal
TB: transport block
TM: transmission mode
TTI: Transmission Time Interval
TDD: Time division duplex
TPC: Transmission power control
TRP: Transmit Receive Point
TXOP SFN/SN: Transmit opportunity system frame number/subframe number
UCI: Uplink Control Information
udCompMethod: user data compression method
udCompParam: user data compression parameter
UE: user equipment
UL: uplink
UL DMRS: uplink demodulation reference signal
ULSCH: Uplink Shared Channel
UNII radio band: Unlicensed National Information Infrastructure radio band
vBBU: Virtualized baseband unit
VNF: Virtual Network Function
xRAN: extensible Radio Access Network
XRB: xRAN resource block

The invention claimed is:

1. A method of providing a fronthaul interface in a cloud radio access network (CRAN) having a baseband unit (BBU) and at least one radio unit (RU) remote from the BBU, the method comprising:
providing radio frequency interface (RF) functionality in the RU;
providing physical layer (PHY) functionality split between the BBU and the RU, wherein downlink (DL) precoding is implemented in the RU; and
providing transmission of a reference signal from the BBU to the RU separately from transmission of data from the BBU to the RU by:
adding a flag to a control-plane (C-plane) message to indicate the transmission of the reference signal from the BBU to the RU contains reference signal to be stored locally at the RU based on at least one of subframe, symbol, xRAN resource block (XRB), and resource element (RE) associated with the reference signal;
locally storing, by the RU, the transmitted reference signal based on the at least one of subframe, symbol, XRB and RE associated with the reference signal;
indicating a location of the reference signal by using a resource element mask (reMask);
automatically inserting, in an RU transmission, the locally stored reference signal with associated data, based on the at least one of subframe, symbol, XRB and RE associated with the reference signal; and
sending update to the reference signal as stand-alone packets using a C-plane section type for precoding at the RU, avoiding combining said update with said data.

2. The method of claim 1, further comprising:
enabling said flag with new content and a new reMask; and
invalidating previously stored information for the XRB associated with the reference signal.

3. The method of claim 1, further comprising:
in downlink (DL) physical-layer processing, (i) converting at least a portion of bit stream into in-phase (I) and quadrature (Q) values forming a constellation, and (ii) transmitting at least a constellation index to the RU over the fronthaul instead of I and Q values.

4. The method of claim 3, wherein the I and Q values are converted into a normalized constellation index and a scalar field, and wherein the normalized constellation index and the scalar field are transmitted to the RU over the fronthaul instead of the I and Q values.

5. The method of claim 1, wherein the fronthaul interface is configured to support at least one of: (i) narrow band Internet of things (NB-IoT) physical random access channel (PRACH), and (ii) NB-IoT multi-tone format on physical uplink shared channel (PUSCH).

6. The method of claim 5, further comprising:
for the NB-IoT PRACH, at least one of: (i) transmitting 48 subcarriers corresponding to 180 KHz over the fronthaul interface; and (ii) determining, by the BBU, PRACH tone locations.

7. The method of claim 5, further comprising:
for the NB-IoT multi-tone format on PUSCH, transmitting over the management (M) plane the number of tones to be used.

8. A cloud radio access network (CRAN) system, comprising:
a baseband unit (BBU); and
a radio unit (RU) remote from the BBU;
wherein fronthaul interface between the RU and the BBU comprises:
radio frequency interface (RF) functionality implemented in the RU; and
implementation of physical layer (PHY) functionality split between the BBU and RU, wherein downlink (DL) precoding is implemented in the RU;
the fronthaul interface being configured to provide a transmission of a reference signal from the BBU to the RU separately from a transmission of data from the BBU to the RU by:
adding a flag to a control-plane (C-plane) message to indicate the transmission of the reference signal from the BBU to the RU contains reference signal to be stored locally at the RU based on at least one of subframe, symbol, xRAN resource block (XRB), and resource element (RE) associated with the reference signal;

locally storing, by the RU, the transmitted reference signal based on the at least one of subframe, symbol, XRB and RE associated with the reference signal;

indicating a location of the reference signal by using a resource element mask (reMask);

automatically inserting, in an RU transmission, the locally stored reference signal with associated data, based on the at least one of subframe, symbol, XRB and RE associated with the reference signal; and sending update to the reference signal as stand-alone packets using a C-plane section type for precoding at the RU, avoiding combining said update with said data.

9. The CRAN system of claim 8, wherein the fronthaul interface is configured to provide the transmission of the reference signal from the BBU to the RU separately from the transmission of data from the BBU to the RU by further providing:

enabling said flag with new content and a new reMask; and invalidating previously stored information for the XRB associated with the reference signal.

10. The CRAN system of claim 8, wherein, in downlink (DL) physical-layer processing, at least a portion of bit stream is converted into in-phase (I) and quadrature (Q) values forming a constellation, and at least a constellation index is transmitted to the RU over the fronthaul instead of I and Q values.

11. The CRAN system of claim 10, wherein the I and Q values are converted into a normalized constellation index and a scalar field, and wherein the normalized constellation index and the scalar field are transmitted to the RU over the fronthaul instead of the I and Q values.

12. The CRAN system of claim 8, wherein the fronthaul interface is configured to support at least one of: (i) narrow band Internet of things (NB-IoT) physical random access channel (PRACH), and (ii) NB-IoT multi-tone format on physical uplink shared channel (PUSCH).

13. The CRAN system of claim 12, wherein for the NB-IoT PRACH, at least one of: (i) 48 subcarriers corresponding to 180 KHz are transmitted over the fronthaul interface; and (ii) the BBU determines PRACH tone locations.

14. The CRAN system of claim 12, wherein for the NB-IoT multi-tone format on PUSCH, the number of tones to be used is transmitted over the management (M) plane.

* * * * *